US012286822B2

(12) United States Patent
Capozziello et al.

(10) Patent No.: US 12,286,822 B2
(45) Date of Patent: Apr. 29, 2025

(54) MORTISE LOCK WITH MULTI-POINT LATCH SYSTEM

(71) Applicant: SARGENT MANUFACTURING COMPANY, New Haven, CT (US)

(72) Inventors: Mike Capozziello, North Haven, CT (US); Darren Eller, East Lyme, CT (US); Chris Gaughan, Guilford, CT (US); Andrew Geraci, New Haven, CT (US); Kelsey Gilmore, Southington, CT (US); Lee Griswold, Bethel, CT (US); Christopher C. Hill, New Britain, CT (US); Jason Reutenauer, West Haven, CT (US)

(73) Assignee: SARGENT MANUFACTURING COMPANY, New Haven, CT (US)

( * ) Notice: Subject to any disclaimer, the term of this patent is extended or adjusted under 35 U.S.C. 154(b) by 485 days.

(21) Appl. No.: 17/559,682

(22) Filed: Dec. 22, 2021

(65) Prior Publication Data

US 2022/0112749 A1 Apr. 14, 2022

Related U.S. Application Data

(63) Continuation of application No. 16/325,909, filed as application No. PCT/US2017/030951 on May 4, 2017, now Pat. No. 11,208,832.

(Continued)

(51) Int. Cl.

*E05C 9/20* (2006.01)
*E05B 15/10* (2006.01)

(Continued)

(52) U.S. Cl.

CPC .............. *E05C 9/20* (2013.01); *E05B 15/102* (2013.01); *E05B 59/00* (2013.01);

(Continued)

(58) Field of Classification Search

CPC ........ E05B 15/10; E05B 15/102; E05B 17/06; E05B 59/00; E05B 63/0056; E05B 63/06;

(Continued)

(56) References Cited

U.S. PATENT DOCUMENTS 1,708,078 A * 4/1929 Bolles ................ E05B 65/1066 292/5
2,066,705 A 1/1937 Vazquez (Continued)

*Primary Examiner* — Christopher J Boswell
(74) *Attorney, Agent, or Firm* — DeLio Peterson & Curcio LLC; David R. Pegnataro

(57) ABSTRACT

An adapter and interface permits a standard mortise lock to drive top and bottom latch mechanisms of a multi-point lock system. An actuator permits in situ adjustment of the top and bottom vertical latch projections of adjusting these projections while the door is hung in the door frame. An installation tool assists in the installation of the vertical rods in a door. A connector and carrier secures the vertical rods to the actuator and permits verification of retention of the rods in a multi-point latching system. A latch dogging indicator allows for end-user adjustment between a single-point lock and a multi-point lock system when desired. These different aspects may be employed in combination or separately with other locking systems.

16 Claims, 30 Drawing Sheets

Related U.S. Application Data

(60) Provisional application No. 62/381,755, filed on Aug. 31, 2016, provisional application No. 62/381,758, filed on Aug. 31, 2016, provisional application No. 62/381,337, filed on Aug. 30, 2016, provisional application No. 62/381,343, filed on Aug. 30, 2016, provisional application No. 62/381,332, filed on Aug. 30, 2016, provisional application No. 62/381,321, filed on Aug. 30, 2016.

(51) Int. Cl.

| | |
|---|---|
| ***E05B 59/00*** | (2006.01) |
| ***E05B 63/00*** | (2006.01) |
| ***E05B 63/06*** | (2006.01) |
| ***E05B 65/10*** | (2006.01) |
| ***E05C 9/04*** | (2006.01) |
| ***E05C 9/24*** | (2006.01) |
| *B25B 15/02* | (2006.01) |
| *E05B 17/06* | (2006.01) |
| *E05B 63/08* | (2006.01) |
| *E05B 63/16* | (2006.01) |
| *E05F 1/12* | (2006.01) |

(52) U.S. Cl.

CPC .......... *E05B 63/0056* (2013.01); *E05B 63/06* (2013.01); *E05B 65/1006* (2013.01); *E05C 9/04* (2013.01); *E05C 9/24* (2013.01); *B25B 15/02* (2013.01); *E05B 17/06* (2013.01); *E05B 63/08* (2013.01); *E05B 63/16* (2013.01); *E05F 1/12* (2013.01); *E05Y 2900/132* (2013.01)

(58) Field of Classification Search

CPC .......... E05B 63/08; E05B 63/16; E05B 63/20; E05B 65/10; E05B 65/1006; E05C 9/006; E05C 9/04; E05C 9/041; E05C 9/20; E05C 9/24; B25B 15/008; B25B 15/02; E05F 1/12

See application file for complete search history.

(56) References Cited

U.S. PATENT DOCUMENTS

| | | | | |
|---|---|---|---|---|
| 2,887,336 | A * | 5/1959 | Meyer | E05B 65/1013 292/336 |
| 2,975,318 | A | 3/1961 | Nicoll | |
| 4,311,329 | A * | 1/1982 | Kral | E05B 65/104 49/7 |
| 4,601,499 | A * | 7/1986 | Kim | E05C 9/20 292/DIG. 60 |
| 4,905,347 | A | 3/1990 | Worth | |
| 5,042,851 | A * | 8/1991 | Hunt | E05C 9/20 292/DIG. 60 |
| 5,308,184 | A | 5/1994 | Bernard | |
| 5,688,002 | A * | 11/1997 | Riley | E05B 65/104 292/66 |
| 5,795,467 | A | 8/1998 | Justice | |
| 5,992,188 | A | 11/1999 | Saunders | |
| 6,174,004 | B1 | 1/2001 | Picard et al. | |
| 7,475,578 | B2 | 1/2009 | Brown et al. | |
| 7,878,034 | B2 | 2/2011 | Alber et al. | |
| 8,234,892 | B2 | 8/2012 | Laverty et al. | |
| 8,491,019 | B2 | 7/2013 | Uyeda | |
| 9,518,411 | B2 * | 12/2016 | Dery | E05B 63/06 |
| 10,094,142 | B2 * | 10/2018 | Kondi | E05B 63/06 |
| 10,920,453 | B2 | 2/2021 | Capozziello et al. | |
| 10,975,596 | B2 * | 4/2021 | Lin | E05B 63/20 |
| 2005/0132766 | A1 | 6/2005 | Milo | |
| 2007/0210589 | A1 | 9/2007 | vanGasselt | |
| 2011/0163553 | A1 | 7/2011 | Fleming | |
| 2013/0097938 | A1 | 4/2013 | Madrid | |
| 2015/0308155 | A1 | 10/2015 | Eller et al. | |
| 2017/0292293 | A1 * | 10/2017 | Lin | E05C 9/24 |
| 2019/0226240 | A1 | 7/2019 | Sullivan | |
| 2021/0095503 | A1 | 4/2021 | Nussbaum | |
| 2021/0388648 | A1 * | 12/2021 | Geraci | E05B 63/20 |
| 2022/0112746 | A1 * | 4/2022 | Geraci | E05B 65/1046 |

* cited by examiner

SECTION 17-17

MORTISE LOCK WITH MULTI-POINT LATCH SYSTEM

BACKGROUND OF THE INVENTION

1. Field of the Invention

This invention relates to mortise locks and to multi-point locks including vertical rod door latches.

2. Description of Related Art

Vertical rod door latches are door latches commonly used in commercial or public buildings where the door latches are located at the top and/or bottom edge of the door. Vertical rod door latches typically include one or more latches or catches that extend upward out of the top and/or downward from the bottom edge of the door into a corresponding opening in a strike located in the door frame above the door or on the floor below the door.

The latches are most commonly driven into and out of engagement with the corresponding strike by vertical rods extending from an actuator located near the midpoint of the door to the top and/or bottom latches. The vertical rods extending from the actuator may be hidden inside the door or located on the surface of the door and they may drive the latches at each point with either a pulling or pushing motion. Typical multi-point applications use a pushbar or pushrail type exit device to drive the latch points or require a custom latch to interface with the vertical rod actuator.

Mortise locks, which are mounted between the inner and outer exterior panels or surfaces of the door (also known as the door skins), are used for operating and actuating a standard lateral or mid-point latch which extends from the lock at the side edge of the door. There is currently no standard mortise lock that is able to actuate vertical rod door latches.

Typically, latch projection is set before a door is installed and final adjustments require the door to be taken down and re-adjusted, then installed again. There is currently no multi-point lock system which allows for adjustment of latch projections while the door is hung, nor is there a mechanism for ensuring that latch projection adjustments for the top and/or bottom vertical rod latch(es) are from center.

After door installation, vertical latch projections are typically engaged and disengaged by means of pushing the latches into place by hand once the door is closed, or by pulling the projections out from the door frame to allow for opening the door. This requires an end-user to reach the top and bottom edges of the door in order to engage/disengage the top and bottom latch projections out of their respective strikes in the door frame/floor. This method of latch extension/retraction can be cumbersome and difficult for handicapped persons.

With the vertical rod and latch assembly typically concealed inside a cavity in the door, installation of the rods is complicated due to the inability of the installer to have a clean line of sight to the connection between the lock interface and the rod. A need exists for simplified installation of a multi-point lock system in a door with a concealed rod and latch assembly.

Although stiff vertical rods capable of applying a push or pull force to the latch points are the most common method of driving the latches, for the purpose of this application, the term "vertical rod door latch" is not intended to be limited to designs using only stiff vertical rods. The term is intended to include other mechanical drive mechanisms for driving the top and bottom latch points, such as cable drive systems and any other method by which an actuator mounted on the door can apply force to mechanically drive latch points at the top and/or bottom edges of the door.

The actuator most commonly used to drive the latch points of a vertical rod door latch includes a lever handle, or a pushbar or pushrail type exit device. An "exit device" is a lock mechanism operated from the inside of an exit door through the use of a crossbar, pushbar, pushrail, panic bar or paddle actuator that moves towards the exit door to retract the latches when pressure is applied.

A latch dogging switch holds the latches in place when retraction is desirable when the end user wishes to engage only a single mid-point or lateral latch located on the vertical edge of the door, near the actuator. There is a need for a latch dogging switch that allows for the option to designate between a single-point locking system and a multi-point locking system.

There is also a need for a latch dogging switch that can indicate whether the vertical rod door latches have been retracted. Such a design could be used regardless of whether the vertical rod door latch is mechanically driven by an exit device, a lever handle trim or any other type of handle or trim capable of driving the vertical rod latch. It would be desirable to be able to supply such an independent latch dogging switch design at the time of purchase with an existing mechanical actuator, such as an exit device or handle trim, or to be able to install the latch dogging switch in the field, where it is to be connected as a retrofit to drive a previously installed mechanically operated vertical rod door latch.

SUMMARY OF THE INVENTION

Bearing in mind the problems and deficiencies of the prior art, it is therefore an object of the present invention to provide an adapter and method whereby a standard mortise lock may be made to actuate vertical rod door latches.

It is another object of the present invention to provide an apparatus and method that permits positive attachment and verification of retention of a vertical rod in a multi-point latching system.

A further object of the present invention is to provide a multi-point lock system and method that allows for in situ adjustment of top and bottom vertical latch projections from center, i.e., the central actuator in the door interior.

It is also an object of the present invention to provide an apparatus and method whereby the top and bottom latch projections of a multi-point lock system may be adjusted while a door is hung in the door frame.

It is another object of the present invention to provide a tool for installation of vertical rods in a door with a concealed rod and latch assembly.

It is another object of the present invention to provide a tool for installation of vertical rods in a door with a concealed rod and latch assembly which assists in alignment of the rod with an opening in the lock interface.

A further object of the present invention is to simplify alignment of vertical rods in a door with a concealed rod and latch assembly of the rod with the lock interface by providing an alignment guide which is slideably retractable along the rod and remains concealed in the door after final installation.

Yet another object of the present invention is to provide a latch dogging switch and method of use which selectively holds the latches in place when retraction is desirable when the end user wishes to engage only a single mid-point or lateral latch located on the vertical edge of the door.

It is also an object of the present invention to provide a latch dogging switch and method that can indicate whether the vertical rod door latches have been retracted.

Still other objects and advantages of the invention will in part be obvious and will in part be apparent from the specification.

The above and other objects, which will be apparent to those skilled in the art, are achieved in the present invention which is directed to mortise locks and to multi-point locks such as vertical rod door latches. More specifically, it is directed in several aspects to an adapter and interface that permits a standard mortise lock to drive top and bottom latch mechanisms of a multi-point lock system. An actuator permits in situ adjustment of the top and bottom vertical latch projections of adjusting these projections while the door is hung in the door frame. An installation tool assists in the installation of the vertical rods in a door. A connector and carrier secures the vertical rods to the actuator and permits verification of retention of the rods in a multi-point latching system. A latch dogging indicator allows for end-user adjustment between a single-point lock and a multi-point lock system when desired. These different aspects may be employed in combination or separately with other locking systems.

In one aspect, the present invention provides an adapter for enabling a mortise lock with a mid-point latch to actuate a vertical rod latch. The mortise lock is mounted between outer panels of a door and has a handle shaft opening for a hub rotatable by a handle to actuate a mid-point latch. The mid-point latch extends therefrom at a door edge from an extended locked position to a retracted open position. The adapter has a housing with an actuator for a vertical rod door latch. The actuator moves a vertical rod door latch from an extended locked position to a retracted open position. The adapter also has a hub rotatable with respect to the housing. The hub has a handle shaft opening for and is rotated by the mortise lock handle shaft. The hub handle shaft opening is positioned in alignment with the mortise lock handle shaft opening between the mortise lock and an inner surface of the door outer panel. The adapter hub is operatively connected to the vertical rod door latch actuator, where rotation of the adapter hub by the handle shaft moves the vertical rod door latch from an extended locked position to a retracted open position. Simultaneously, the handle shaft rotates the mortise lock handle shaft opening and hub to move the mid-point latch from an extended locked position to a retracted open position.

The adapter may further include an arm between the adapter hub and the vertical rod door latch actuator. The arm is moveable with operation of the adapter hub, such that the arm causes the vertical rod door latch to move from an extended locked position to a retracted open position when the adapter hub is rotated by the handle shaft.

The adapter housing may include a pair of sleeves positionable on both sides of a mortise lock, between the mortise lock and the inner surfaces of door outer panels. The sleeves may include an adapter hub with a handle shaft opening on each sleeve, and each adapter hub has an arm extending therefrom that is engageable with the actuator mechanism to cause a vertical rod door latch to move from an extended locked position to a retracted open position.

A further aspect of the present invention provides a method of enabling a mortise lock with a mid-point latch to actuate a vertical rod door latch in a door having outer panels. The method provides a mortise lock having an opening for a shaft of a handle to actuate a mid-point latch extending therefrom at a door edge from an extended locked position to a retracted open position. It further provides an adapter having a housing with an actuator for a vertical rod door latch. The actuator moves a vertical rod door latch from an extended locked position to a retracted open position. The adapter hub is rotatable with respect to the housing, and has a handle shaft opening for and rotatable by the mortise lock handle shaft. The adapter hub handle shaft opening is positioned in alignment with the mortise lock handle shaft opening between the mortise lock and an inner surface of a door outer panel. Rotation of the adapter hub by the handle shaft causes the vertical rod door latch to move from an extended locked position to a retracted open position while the handle shaft simultaneously rotates the mortise lock handle shaft opening and hub to move the mid-point latch from an extended locked position to a retracted open position. The method includes inserting the adapter into a door edge between the door outer panels and operatively connecting the adapter to the vertical rod door latch in the door. The mortise lock is then inserted into the adapter in the door edge and handle shaft opening is aligned with the adapter hub handle shaft opening. A handle shaft is inserted through an opening in the outer door panel and extends into both the adapter hub handle shaft opening and the mortise lock handle shaft opening. Rotating the handle shaft causes the vertical rod door latch and mid-point latch to simultaneously move from an extended locked position to a retracted open position.

The adapter may include an arm between the adapter hub and the vertical rod door latch actuator. The arm is moveable with operation of the adapter hub such that rotation of the adapter hub by the handle shaft causes the arm to move the vertical rod door latch from an extended locked position to a retracted open position.

The housing may include a pair of sleeves which are positionable on both sides of a mortise lock, between the mortise lock and the inner surfaces of door outer panels. The housing may further include an adapter hub with a handle shaft opening on each housing sleeve. Each adapter hub has an arm extending therefrom that is engageable with the actuator mechanism to cause the vertical rod door latch to move from an extended locked position to a retracted open position.

It is another object of the present invention to provide an actuator for moving a vertical rod door latch between locked and open positions, and for permitting adjustment of vertical latch projections from a door. The actuator has a housing, a connector for securing an end of a vertical rod to the actuator, a worm drive comprising a worm screw and worm wheel coupled to the housing, and a receiver coupled to the worm wheel that has an opening adapted to engage an outer surface of the vertical rod when inserted. Actuation of the worm drive rotates the vertical rod to adjust the depth of the latch projection in upward and downward directions with respect to the opening in the strike.

Adjustment of the depth of a vertical latch projection is permitted after a door is secured in a door frame. The worm drive may be disposed at the end of a vertical rod distal from the latch. Adjustment of the depth of the vertical latch projection is effected at the worm drive. The worm drive may include an opening in its end adapted for receiving a rotatable tool. The worm drive is actuated by inserting the tool into the opening and rotating the device in a direction normal to the longitudinal axis of the vertical rod.

In yet another aspect the present invention provides an actuator for moving a vertical rod door latch between locked and open positions, and for permitting adjustment of projection of the vertical latch from a door into an opening in a door strike. The door latch has a vertical rod secured thereto by a threaded coupling to adjust the distance therebetween. The actuator comprises a housing, a receiver in the housing that has an opening adapted to engage an outer surface of the vertical rod when inserted therein. The actuator also has a driver to rotate the receiver, and a connector for securing an end of the vertical rod within the receiver in the actuator housing. The driver is engaged at the actuator to rotate the receiver and rotate the vertical rod with respect to the latch, and adjusts a depth of the latch projection in upward and downward directions with respect to the opening in the strike.

The actuator may further include a tool for engaging the driver to rotate the receiver. The tool is engageable with the driver while the actuator is installed within a door, and after the door is secured in a door frame.

A further aspect of the present invention is directed to a method of adjusting a vertical latch projection in a multi-point locking system. The method provides a door for mounting in a door frame. The door frame has a strike with an opening therein located above or below the door. It also provides a vertical rod having first and second ends within the door. The method further provides a vertical rod door latch assembly at the top or bottom of the door comprising a latch movable between an extended locked position and a retracted open position. The latch is adapted to extend into the strike opening when in the locked position. The latch is secured to the vertical rod second end by a threaded coupling to adjust the distance therebetween. The method further provides an actuator within the door for moving the vertical rod door latch between the extended locked and retracted open positions. The actuator comprises a housing, a receiver in the housing having an opening engaging an outer surface of the first end of the vertical rod, a driver to rotate the receiver, and a connector for securing the first end of the vertical rod within the receiver in the actuator housing. Engaging the driver at the actuator rotates the receiver and rotates the vertical rod with respect to the latch, and adjusts a depth of the latch projection in upward and downward directions with respect to the opening in the strike.

The driver may comprise a worm drive having a worm screw and worm wheel. The worm drive is coupled to the housing, and a receiver is coupled to the worm wheel. The driver is engaged by rotating the worm to rotate the worm wheel and the receiver. The worm may have an opening in an end adapted for receiving a rotatable tool. The driver is engaged by inserting the tool into the interior of a door and into the worm opening, and by rotating the tool in a direction normal to the longitudinal axis of the vertical rod. The method may further comprise securing a vertical rod first end to an actuator with a connector after setting the depth of the latch projection to a desired depth.

A further aspect of the present invention provides a vertical rod door latch locking system that permits adjustment of projection of the vertical latch from a door into an opening in a door strike. A vertical rod door latch assembly comprises a latch moveable between an extended locked position and a retracted open position. The latch is adapted to extend into the door strike opening when in the locked position. A vertical rod has first and second ends, the second end being secured to the latch by a threaded coupling to adjust the distance therebetween by rotation of the vertical rod. An actuator for moving the vertical rod comprises a housing, a receiver in the housing having an opening engaging an outer surface of the vertical rod first end, and a drive to rotate the receiver and the vertical rod with respect to the latch. The driver adjusts the depth of the latch projection in upward and downward directions with respect to the opening in the strike. A tool for engaging the driver to rotate the receiver and the vertical rod is engageable with the driver while the actuator is installed within a door and after the door is secured in a door frame.

Still another aspect of the present invention is directed to a retention system for a vertical rod door latch having a rod with an end and a carrier. The carrier secures the rod end to an actuator to move the vertical rod door latch between engaged and disengaged positions. The carrier has an opening for receiving the rod end, a securing member for mechanically engaging the rod end, and a screw for urging the securing member against the rod end to retain the rod in the carrier. The screw has at least one indentation around its periphery. The carrier includes at least one spring surface for bearing against at least one indentation of the screw. The spring is moveable to permit a user to rotate and tighten the screw to urge the securing member against the rod end. The spring surface applies a force to the at least one indentation to restrict loosening rotation of the screw, thereby retaining the rod end in the carrier. In an embodiment, at least one indentation in a screw comprises at least one flat surface portion in a shank portion of the screw.

The screw may include a shank with a plurality of indentations. The indentations comprise a plurality of flat surface detent portions extending around the shank. The spring includes a pair of parallel legs extending through openings in the carrier. The screw is disposed between the spring legs with surfaces of the spring legs bearing against opposite flat surface portions of the screw shank. The spring legs are moveable outward upon tightening of the screw and bears against flat surface portions on opposite sides of the screw shank to restrict loosening rotation of the screw when the securing member is in position to retain the rod end in the carrier.

The screw may have a head with a plurality of indentations, the indentations comprising a plurality of flat surface portions extending around the head. A spring includes a pair of parallel legs on either side of the screw head, and is in a deformed position permitting rotation of the screw head and tightening of the screw. In an undeformed position, the spring has the surfaces of the leg bearing against flat surface portions on opposite sides of the screw head to restrict loosening rotation of the screw when the securing member is in position to retain the rod end in the carrier. A further embodiment provides a vertical rod having a grooved end and a securing member that engages the grooves on the rod end.

Yet another aspect of the present invention provides a method of retaining an end of a vertical rod in a vertical rod door latch latching system. The method provides a carrier for securing the rod end to an actuator to move the vertical rod door latch between engaged and disengaged positions. The carrier has an opening for receiving the rod end, a securing member for mechanically engaging the rod end, and a screw for urging the securing member against the rod end to retain the rod in the carrier. The screw has at least one indentation around its periphery. The carrier includes at least one spring surface for bearing against the at least one indentation of the screw. Rotating the screw towards the securing member urges it against the rod end. The spring surface is alternately moved outward and inward between contact with at least one indentation. Tightening the set screw of the securing member into a final tightened position retains the rod end in the carrier. The spring moves inward to a detent position, where its surface bears against the indentation to resist and restrict loosening rotation of the screw.

Another aspect of the present invention is directed to a method of retaining an end of a vertical rod in a vertical rod door latch latching system. A carrier for securing the rod end to an actuator moves the vertical rod door latch between engaged and disengaged positions. The carrier has an opening for receiving the rod end, a securing member for mechanically engaging the rod end, and a screw for urging the securing member against the rod end to retain the rod in the carrier. The screw has at least one indentation around its periphery. The carrier includes at least one spring surface for bearing against at least one indentation of the screw. The method includes deforming the spring by moving the spring surface out of contact with at least one indentation of the screw, rotating the screw into a tightened final position of the securing member to retain the rod end in the carrier, and releasing the spring to an undeformed position, wherein the spring surface moves back into contact with and bears against at least one indentation of the screw, resists and restricts loosening rotation of the screw.

In a further aspect the present invention provides a set screw retention system with a housing, a set screw, and a spring. The housing secures a member therein, and has an opening for receiving the member to be secured and a threaded opening for receiving the set screw to secure the member in the housing. The set screw has an unthreaded shank with a plurality of flat surface detent portions around the shank periphery. The spring has at least one leg bearing against the shank of the set screw. The spring is moveable to permit a user to rotate and tighten the screw to secure the member in the housing. The spring leg bears against at least one flat surface detent portion on the shank periphery when the set screw is in a tightened position to apply a force to restrict loosening rotation of the screw, thereby retaining the member in the housing.

The spring may include a pair of parallel legs extending through openings in the housing. The set screw is disposed between the spring legs with surfaces of the spring legs bearing against opposite flat surface portions of the set screw shank when the set screw is in a tightened position. The spring legs are moveable outward upon tightening of the screw.

Another aspect of the present invention provides a set screw retention system that includes a housing, a set screw, and a spring. The housing secures a member therein and has an opening for receiving the member to be secured, as well as a threaded opening for receiving the set screw to secure the member in the housing. The set screw has a head with a plurality of flat surface portions extending around the head. A spring has a pair of parallel legs on either side of the screw head, and in a deformed position permits rotation of the screw head and tightening of the screw. In an undeformed position, the spring has its spring legs bearing against flat surface portions on opposite sides of the screw head when the set screw is in a tightened position to apply a force that restricts loosening rotation of the screw, thereby retaining the member in the housing.

The spring may be moved into a deformed position in a direction towards a member. The spring clears a set screw head and permits rotation thereof. Upon release, the spring moves to the undeformed position wherein the legs engage the flat surface portions of the screw head on opposite sides when the set screw is in a tightened position.

Yet another aspect of the present invention is directed to a retention system for a vertical rod door latch. A carrier secures a rod end to an actuator to move the vertical rod door latch between engaged and disengaged positions. The carrier also has an opening for receiving the rod end. A securing member in the carrier mechanically engages the rod end. A locking gate member moveable between open and closed positions permits the securing member to release the rod end when in the open position. In the closed position, the gate member holds the securing member against the rod end and retains the rod end in the carrier.

The system may further include a button moveable in an opening in the carrier in a direction normal to a longitudinal axis of a vertical rod. The button urges a securing member toward the rod end. A gate member in the open position is out of the path of movement of the button, thus permitting the securing member to release the rod end. In the closed position, the gate member blocks the path of movement of the button, and holds the button inward against the securing member. The securing member is thus held against the rod end and retains the rod end in the carrier. The button may include a planar face and an outwardly stepped flat edge portion on its head. The button's planar face comes in contact with a gate member when the gate member is in a closed position.

The system may further include a flexible member between a button and a securing member. The flexible member becomes compressed when the button urges the securing member against a rod end.

The button may include a planar face and an outwardly stepped flat edge portion on the button's head. A gate member is slideable in at least one opening in a carrier, in a direction parallel to a longitudinal axis of a rod. The gate member includes an edge for contacting the flat edge of the button head. The button's planar face and the gate member come in contact when the gate member is in the closed position portion to restrict loosening of the button. The gate may have a pair of parallel legs on either side of the gate edge. The gate legs are slideable in openings in a carrier oriented in directions parallel to a longitudinal axis of a rod. The button head flat edge portion may be oriented in a position normal to a longitudinal axis of a rod when a gate member is in a closed position, such that the gate edge contacts the button head flat edge portion. The button can be rotated to urge the button head flat edge portion against the gate edge and move the gate member out of the path of movement of the button. This permits the button to move outward of the carrier housing and also permits a securing member to be loosened and moved away from a rod end to permit the rod to be removed from the rod carrier.

Another aspect of the present invention provides a method of retaining an end of a vertical rod in a vertical rod door latch latching system. A carrier secures a rod end to an actuator to move the vertical rod door latch between engaged and disengaged positions. The carrier has an opening for receiving the rod end, a securing member for mechanically engaging the rod end, and a locking gate member moveable between open and closed positions. In the open position, the gate member permits the securing member to release the rod end. In the closed position, the gate member holds the securing member against the rod end and retains the rod end in the carrier. The method includes moving the gate member to an open position so the securing member may release the rod end, rotating the securing member towards the rod end and urging itself against the rod, and moving the gate member to a final closed position to hold the securing member against the rod end, thus retaining the rod end in the carrier.

A button may be moveable in an opening in the carrier in a direction normal to a longitudinal axis of a vertical rod. This includes moving a gate member to an open position out of the path of movement of the button, and permitting a securing member to release a rod end. Moving the gate member to a final closed position blocks the path of movement of the button and holds the button inward against the securing member, the securing member which is thus held against the rod end.

The method may include providing a flexible member between the button and the securing member. The flexible member is compressed when the button urges the securing member against a rod end. The button includes a planar face and an outwardly stepped flat edge portion on a head of the button. A gate member is slideable in at least one opening in a carrier in a direction parallel to the longitudinal axis of the rod. The gate member includes an edge for contacting the button head flat edge. Moving the gate member to a final closed position wherein the button planar face and gate member are in contact restricts loosening of the button.

The method may include moving the gate member to a final closed position so that a button head flat edge portion is oriented in a position normal to a longitudinal axis of the rod. The gate edge is in contact with the button head flat edge portion. The method further includes rotating the button to urge the button head flat edge portion against the gate edge to move the gate member out of the path of the movement of the button, thereby permitting the button to move outward of the carrier housing. This causes the securing member to be loosened and moved away from the rod end to permit the rod to be removed from the rod carrier.

A further aspect of the present invention is directed to a retention system including a housing, a securing member, a button, a flexible member, and a locking gate member. The housing secures a member therein and has an opening for receiving the member to be secured. The securing member is in the housing, and mechanically engages the member to be secured. The button is moveable in an opening in the housing in a direction normal to an axis of reception of the member. It urges the securing member toward the member to be secured. The flexible member is between the button and the securing member, and is compressed when the button urges the securing member against the member to be secured. The locking gate member is slideable between open and closed positions in at least one opening in the housing. In an open position, the gate member is out of the path of movement of the button and permits the securing member to release the member to be secured. In the closed position, the gate member blocks the path of movement of the button to hold the button inward, and holds the securing member against the member to be secured, thus retaining it in the housing.

The button may include a planar face and an outwardly stepped flat edge portion on a head of the button. A gate member is slideable in at least one opening in a housing in a direction parallel to the axis of reception of a member. The gate member includes an edge for contacting the button head flat edge, where the button planar face and the gate member come in contact when the gate member is in the closed position portion to restrict loosening of the button.

The button head flat edge portion may be oriented in a position normal to the axis of reception of a member. A gate member is in a closed position so that the gate edge is in contact with the button head flat edge portion, and the button may be rotated to urge the button head flat edge portion against the gate edge to move the gate member out of the path of movement of the button. This permits the button to move outward of a housing, and for a securing member to be loosened and moved away from the member to be secured, thus permitting it to be removed from the housing.

Still another aspect of the present invention provides a tool for installing a rod in a door having a concealed vertical rod door latch assembly. The rod has a first end for attachment to a receiver coupled to a lock interface and an opening for receiving the rod first end and a second end for driving a latch. The tool comprises a sleeve positionable around the rod and moveable along a longitudinal axis of the rod to extend beyond the rod first end. The sleeve has a first end configured for mating with the receiver. The rod is moveable within and with respect to the sleeve such that upon mating of the sleeve with the receiver, the rod may be extended beyond the sleeve first end and into the receiver for attachment thereto.

The sleeve first end may have a protrusion extending therefrom configured to mate with an outer surface of the receiver. The sleeve protrusion is adapted to extend around at least a portion of the outer surface of the receiver. The rod may further include a stop for preventing movement of the sleeve in the direction of the rod second end, and the sleeve second end may include a slot for receiving the stop.

The rod may have a non-circular cross-section and the sleeve may have a correspondingly-shaped cross-section for at least a portion of its length for preventing rotation of the sleeve about the longitudinal axis of the rod. The rod has a length sufficient to reach substantially from the top or bottom of the door to the concealed actuator receiver within the door. One or both of the sleeve and rod may be comprised of photoluminescent material.

In another aspect, the present invention is directed to a method for installing a rod in a door having a concealed vertical rod door latch actuator. The method comprises providing a door having a concealed vertical rod door latch actuator in an interior portion of the door, the vertical rod door latch actuator including a receiver having an opening for receiving a vertical rod. The method also provides a rod having a first end for attachment to the actuator receiver and a second end for driving a latch. The method further provides a tool for installing the rod in the door. The tool is coupled to the vertical rod and comprises a sleeve moveable along a longitudinal axis of the rod and extendable beyond the rod first end, the sleeve having a first end configured for mating with the receiver, the rod being moveable within and with respect to the sleeve. The method then further comprises extending the sleeve beyond the first end of the rod, inserting the rod first end and sleeve into the door interior portion, mating the sleeve first end with an outer surface of the receiver and slideably moving the rod with respect to the sleeve in the direction of the actuator receiver and extending the rod beyond the sleeve first end, and inserting the rod first end into the receiver opening for attachment thereto. The method may further comprise the step of securing the rod first end to the lock interface after inserting the rod first end into the receiver opening.

The sleeve first end may have a protrusion extending therefrom configured to mate with an outer surface of the receiver and the sleeve protrusion may extend around at least a portion of the outer surface of the receiver, and the step of mating the sleeve first end with an outer surface of the receiver may comprise aligning the sleeve protrusion with the outer surface of the receiver.

The rod may further include a stop for preventing movement of the sleeve in the direction of the rod second end, and the step of slideably moving the rod within the sleeve in the direction of the actuator receiver and extending the rod beyond the sleeve first end may comprise contacting a second end of the sleeve against the stop as a result of movement of the rod within the sleeve. The sleeve second end may comprise a slot for receiving the stop.

The rod may have a non-circular cross-section and the sleeve may have a correspondingly-shaped cross-section for at least a portion of its length for preventing rotation of the sleeve about the longitudinal axis of the rod. The rod and sleeve may be inserted into a door interior through an opening for a vertical door latch to be actuated by the rod. One or both of the sleeve and rod may be comprised of photoluminescent material.

In still another aspect the present invention provides a latch dogging switch for a vertical rod door latch assembly operable by a handle. The latch assembly comprises a mid-point door latch, a first vertical latch at the top of a door frame and a second vertical latch at the bottom of the door frame. The mid-point and vertical latches are mechanically linked to retract cooperatively from an extended position. A first vertical rod is attached to and drives the first vertical latch, and a second vertical rod is attached to and drives a second vertical latch. The switch comprises a housing, a switch and switch block, and an arm fixture which is affixed to and slides vertically inside of the switch housing. The arm fixture attaches to one of the vertical rods and is moveable therewith. The switch block inside the housing is attached to the switch, and the switch is alternately slideable into a single-point position and a multi-point position. When one of the rods is moved by operation of the handle to retract the vertical latch, the switch may move the switch block to the single-point position, and the switch block holds one of the vertical rods and vertical latches in place in the retracted position. The vertical latches remain retracted upon release of the handle back to its normal position. The mid-point latch continues to operate normally between open and closed positions in conjunction with the subsequent operation of the handle while the switch is in the single point position.

The switch and switch block may be alternately held in the single-point position and the multi-point position by a detent structure in the switch block. The switch block may be slideable in a direction perpendicular to the vertical latches between a multi-point and single-point position. In the multi-point position the arm fixture is moveable with the one of the vertical rods between extended and retracted positions. In the single-point position, the arm fixture holds the one of the vertical rods in the retracted position. The switch block detent structure may comprise a spring and ball bearing. The spring pushes the ball bearings into a groove on the rear faceplate of the housing, holding the switch in place when the switch block is in position. The ball bearings allow for sliding movement of the switch block upon applied force to the switch.

A further aspect of the present invention provides a method of switching between a multi-point and single-point locking system for a door. There is provided a door having a latch structure operable by a handle, the latch structure comprising a mid-point latch, a first vertical latch at the top of the door frame, and a second vertical latch at the bottom of the door frame. The mid-point and vertical latches are mechanically linked to retract cooperatively from an extended position. A first vertical rod is attached to and drives the first vertical latch, and a second vertical rod is attached to and drives the second vertical latch. A latch dogging switch is further provided, which has a housing, and an arm fixture affixed to and vertically slideable within the housing. The arm fixture is attached to one of the vertical rods and is moveable therewith. A switch block is inside the housing and is attached to the switch. The switch is slideable into a single-point position and a multi-point position. When the switch is in the multi-point position, the handle may be operated to retract the mid-point latch, first vertical latch, and second vertical latch. The method includes moving the switch to the single-point position while the mid-point and vertical latches are retracted so that the switch block holds one of the vertical rods and the vertical latches in the retracted position. The method also includes releasing the handle whereupon the vertical latches remain retracted while the switch is still in the single-point position and the mid-point latch continues to operate normally between open and closed positions by subsequent operation of the handle.

In still another aspect of the present invention there is provided an indicator for a vertical rod door latch in a door having a vertical latch at the top and/or bottom of the door. A vertical rod is attached to and drives the vertical latch. The vertical rod door latch is operable between retracted and extended positions. The indicator comprises a housing and an indicator member on the housing attached to the vertical rod and moveable therewith. The indicator member has visible markings corresponding to extension and retraction of the vertical rod door latch. The indicator member displays one marking pattern when the vertical rod door latch is in the retracted position, and displays a different marking pattern when the vertical rod door latch is in the extended position.

When the door has a mid-point latch, the indicator member further includes a visible marking corresponding to the mid-point latch. The indicator may further include an indicator panel on a face of the latch housing, wherein the indicator member markings are visible in the indicator panel.

In yet another aspect the present invention provides a method of indicating whether a vertical rod door latch is engaged. The method provides a door having a vertical latch positioned at the top of a door frame, a vertical rod attached to and driving the latch, the vertical rod which is operable between retracted and extended positions. Further provided is an indicator having a housing, an indicator panel on a face of the housing, and indicator member attached to the vertical rod and moveable therewith. The indicator member has visible markings corresponding to extension and retraction of the vertical rod. The method includes moving the vertical rod into the retracted position and displaying one marking pattern by the indicator member to indicate that the vertical rod is in the retracted position. The method then includes moving the vertical rod into the engaged position and displaying a different marking pattern by the indicator member to indicate that the vertical rod is in the extended position. The door may further include a mid-point latch and the method then includes displaying a visible marking corresponding to the mid-point latch.

The present invention also provides in another aspect an adapter for enabling a mortise lock with a mid-point latch to actuate a vertical rod door latch and adjust the degree of projection of the vertical rod door latch from the door. The mortise lock is mountable between outer panels of a door and has an opening for a handle to actuate a mid-point latch extending therefrom at a door edge from an extended locked position to a retracted open position. The adapter comprises a housing, a receiver in an actuator, a driver, and an adapter hub. The housing has an actuator for a vertical rod door latch, which moves a vertical rod door latch from an extended locked position to a retracted open position. The receiver in the actuator has an opening adapted to engage an end of a vertical rod secured to the vertical rod door latch by a threaded coupling to adjust the distance therebetween. The driver rotates the receiver. The adapter hub is rotatable with respect to the housing, and has a handle shaft opening for and rotatable by the mortise lock handle shaft. The adapter hub handle shaft opening is positionable in alignment with the mortise lock handle shaft opening between the mortise lock and an inner surface of a door outer panel. The adapter hub is operatively connected to the vertical rod door latch actuator, such that upon rotation of the adapter hub by the handle shaft the vertical rod door latch moves from an extended locked position to a retracted open position while the handle shaft simultaneously rotates the mortise lock handle shaft opening and hub to move the mid-point latch from an extended locked position to a retracted open position. The driver may be engaged at the actuator to rotate the receiver and rotate the vertical rod with respect to the latch and adjust a degree of the latch projection in upward and downward directions.

The adapter may further include one embodiment of a carrier for securing an end of a vertical rod within a receiver in an actuator housing. The carrier has an opening for receiving the rod end, a securing member for mechanically engaging the rod end, and a screw for urging the securing member against the rod end to retain the rod in the carrier. The screw has at least one indentation around its periphery. The carrier includes at least one spring surface for bearing against at least one indentation of the screw. The spring is moveable to permit a user to rotate and tighten the screw to urge the securing member against the rod end. The spring surface applies a force to the at least one indentation to restrict loosening rotation of the screw, thereby retaining the rod end in the carrier.

The adapter may also include another embodiment of a carrier for securing an end of a vertical rod within a receiver in an actuator housing. The carrier has an opening for receiving the rod end, a securing member in the carrier for mechanically engaging the rod end, and a locking gate member moveable between open and closed positions. In the open position, the gate member permits the securing member to release the rod end and the gate member in the closed position holds the securing member against the rod end and retains the rod end in the carrier.

The adapter may further include a tool for installing the vertical rod, where the vertical rod has a first end for attachment to a receiver. The tool comprises a sleeve positionable around the vertical rod and moveable along a longitudinal axis of the rod to extend beyond the rod first end. The sleeve has a first end configured for mating with the receiver, and is moveable with respect to the rod such that upon mating of the sleeve with the receiver, the road may extend beyond the sleeve first end and into the receiver for attachment thereto.

The present invention further provides an actuator for moving a vertical rod door latch between locked and open positions, and for permitting adjustment of projection of the vertical latch from a door into an opening in a door strike. The door latch has a vertical rod secured thereto by a threaded coupling to adjust the distance therebetween. The actuator comprises a housing, a receiver in the housing having an opening adapted to engage an end of the vertical rod, a driver to rotate the receiver, and a carrier for securing an end of the vertical rod within the receiver in the actuator housing. The carrier has an opening for receiving the rod end, a securing member for mechanically engaging the rod end, and a screw for urging the securing member against the rod end to retain the rod in the carrier. The screw has at least one indentation around its periphery. The carrier includes at least one spring surface for bearing against at least one indentation of the screw. The spring is moveable to permit a user to rotate and tighten the screw to urge the securing member against the rod end. The spring surface applies a force to at least one indentation to restrict loosening rotation of the screw, thereby retaining the rod end in the carrier. Prior to securing the vertical rod within the receiver with the carrier, the driver may be engaged at the actuator to rotate the receiver and rotate the vertical rod with respect to the latch. This adjusts the depth of the latch projection in upward and downward directions with respect to the opening in the strike.

Still another aspect of the present invention provides an actuator for moving a vertical rod door latch between locked and open positions, and permitting adjustment of projection of the vertical latch from a door into an opening in a door strike. The door latch has a vertical rod secured thereto by a threaded coupling to adjust the distance therebetween. The actuator comprises a housing, a receiver in the housing having an opening adapted to engage an end of the vertical rod, a driver to rotate the receiver, and a carrier for securing an end of the vertical rod within the receiver in the actuator housing. The carrier has an opening for receiving the rod end, a securing member in the carrier for mechanically engaging the rod end, and a locking gate member moveable between open and closed positions. The gate member in the open position permits the securing member to release the rod end and the gate member in the closed position holds the securing member against the rod end and retains the rod end in the carrier. Prior to securing the vertical rod end within the receiver with the carrier, the driver may be engaged at the actuator to rotate the receiver and rotate the vertical rod with respect to the latch. This adjusts the depth of the latch projection in upward and downward directions with respect to the opening in the strike.

The present invention in yet another aspect provides a method for installing a rod in a door having a concealed vertical rod door latch actuator, and adjusting a vertical rod latch projection. The method provides a door, a concealed vertical rod door latch actuator, a rod, and a tool for installation. The door is for mounting in a door frame having a strike with an opening therein located above or below the door. The vertical rod door latch actuator is in an interior portion of the door for moving the vertical rod door latch between extended locked and retracted open positions. The actuator comprises a housing, a receiver in the housing having an opening for engaging a vertical rod, and a driver to rotate the receiver. The rod has a first end for attachment to the actuator receiver and a second end for driving a latch. The tool is coupled to the vertical rod and comprises a sleeve movable along a longitudinal axis of the rod and extends beyond the rod first end. The sleeve has a first end configured for mating with the receiver, the rod being movable within and with respect to the sleeve. The method includes extending the sleeve beyond the first end of the rod, inserting the rod first end and sleeve into the door interior portion, mating the sleeve first end with an outer surface of the receiver, slideably moving the rod with respect to the sleeve in the direction of the actuator receiver and extending the rod beyond the sleeve first end, and inserting the rod first end into the receiver opening for attachment thereto. A vertical rod door latch assembly is further provided at the top or bottom of the door, comprising a latch moveable between an extended locked position and a retracted open position. The latch is adapted to extend into the strike opening when in the locked position. The method includes securing the latch to the vertical rod second end by a threaded coupling capable of adjusting the distance therebetween, and engaging the driver at the actuator to rotate the receiver and rotate the vertical rod with respect to the latch, and adjust a depth of the latch projection in upward and downward directions with respect to the opening in the strike.

The method may further include the step of securing the rod first end to the actuator after adjusting the depth of the latch projection.

The present invention in a further aspect provides a method for enabling a mortise lock with a mid-point latch to actuate a vertical rod door latch and install the vertical rod for the latch in a door. The door has outer panels, an interior portion therebetween and openings in a side edge and a top or bottom of the door to the interior portion. The mortise lock has an opening for a shaft of a handle to actuate a mid-point latch extending therefrom at a door edge from an extended locked position to a retracted open position. An adapter is provided that has a housing with an actuator for a vertical rod door latch. The actuator includes a receiver having an opening for receiving a vertical rod to be operatively connected to a vertical rod door latch. The actuator is adapted to move the vertical rod door latch from an extended locked position to a retracted open position. An adapter hub rotates with respect to the housing, and has a handle shaft opening for and rotatable by the mortise lock handle shaft. The adapter hub handle shaft opening is positionable in alignment with the mortise lock handle shaft opening between the mortise lock and an inner surface of a door outer panel. The adapter hub upon rotation by the handle shaft causes the vertical rod door latch to move from the extended locked position to the retracted open position while the handle shaft simultaneously rotates the mortise lock handle shaft opening and hub to move the mid-point latch from an extended locked position to a retracted open position. The method includes inserting the adapter through the door side edge opening into the door interior portion. A rod having a first end for attachment to the actuator receiver and a second end for driving a vertical rod door latch is provided. A tool for installing the rod in the door is also provided. The tool is coupled to the vertical rod and comprises a sleeve moveable along a longitudinal axis of the rod and is extendable beyond the rod first end. The sleeve has a first end configured for mating with a receiver. The rod is moveable within and with respect to the sleeve. The method includes extending the sleeve beyond the first end of the rod, and inserting the rod first end and sleeve through the top or bottom opening in the door interior portion. The sleeve first end is mated with an outer surface of the receiver. The rod is slideably moved with respect to the sleeve in the direction of the actuator receiver, and is extended beyond the sleeve first end. The method then includes inserting the vertical rod first end into the receiver opening, and securing the vertical rod to the actuator to operatively connect the adapter to the vertical rod door latch in the door. The method further includes inserting the mortise lock into the adapter in the door side edge opening, and aligning the mortise lock handle shaft opening with the adapter hub handle shaft opening. Using a handle shaft inserted through an opening in the outer door panel and extended into both the adapter hub handle shaft opening and the mortise lock handle shaft opening, the method includes rotating the handle shaft to simultaneously cause the vertical rod door latch and the mid-point latch to move from extended locked positions to retracted open positions.

The actuator may include a driver to rotate the receiver. The method may further include providing a door for mounting in a door frame, the door frame having a strike with an opening therein located above or below the door.

After inserting the rod first end into the receiver opening, and before securing the vertical rod to the actuator, the method includes engaging the driver at the actuator to rotate the receiver and rotate the vertical rod with respect to the latch and adjust a depth of the latch projection in upward and downward directions with respect to the opening in the strike.

In another aspect of the aforementioned method the mortise lock provides a mid-point latch and has a handle extending from the handle shaft, and includes a first vertical latch at the top of a door frame and a second vertical latch at the bottom of the door frame. The mid-point and vertical latches are mechanically linked by the actuator to retract cooperatively from an extended position. A first vertical rod extends from the actuator and attaches to and drives the first vertical latch, and a second vertical rod extends from the actuator and attaches to and drives the second vertical latch. The method further includes providing a latch dogging switch having a housing, an arm fixture affixed to and vertically slideable within the switch housing, the arm fixture attached to one of the vertical rods and moveable therewith. A switch block inside the switch housing is attached to the switch, the switch being slideable into a single-point position and a multi-point position. While the switch is in the multi-point position, the handle is operated to retract the mid-point latch, first vertical latch and second vertical latch. The switch is moved to the single-point position while the mid-point and the vertical latches are retracted. The switch block holds the one of the vertical rods and the vertical latches in the retracted position. The handle is released whereupon the vertical latches remain retracted while the switch is in the single-point position, and the mid-point latch continues to operate normally between open and closed positions by subsequent operation of the handle.

The latch dogging switch may include an indicator panel on the face of the switch housing, and an indicator member attached to one of the vertical rods and moveable therewith. The indicator member has visible markings corresponding to extension and retraction of the vertical rod. The method further includes moving the vertical rod into the retracted position and displaying one marking pattern by the indicator member to indicate that the vertical rod is in the retracted position, and moving the vertical rod into the engaged position and displaying a different marking pattern by the indicator member to indicate that the vertical rod is in the extended position.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

In describing the embodiments of the present invention, reference will be made herein to FIGS. 1-50 of the drawings in which like numerals refer to like features of the invention.

This invention relates to mortise locks and to multi-point locks such as vertical rod door latches. More specifically, it is directed in several aspects to an adapter and interface that permits a standard mortise lock to drive top and bottom latch mechanisms of a multi-point lock system, a method of permitting verification of retention of the vertical rods in a multi-point latching system, an actuator allowing for in situ adjustment of the top and bottom vertical latch projections and a method of adjusting these projections while the door is hung, an installation tool that assists in the installation of the vertical rods in a door with a concealed rod and latch assembly, and a latch dogging indicator that allows for end-user adjustment between a single-point lock and a multi-point lock system when desired. These different aspects may be employed in combination with each other or in combination or separately with other locking systems.

The lock systems and methods described herein are particularly suited for, but not limited to, high security and strength doors, such as tornado doors typically found in a tornado shelter or safe room. A tornado door includes a door shell having a first exterior panel or outer door skin on the impact side of the door and a second exterior panel or inner door skin on the non-impact side of the door. In some embodiments, the tornado door may include an opening for receiving an impact resistant window assembly. The exterior panels may be made of any suitable sheet material, for example a metal or alloy such as about 16 gauge (0.056 in, 1.422 mm) or 20 gauge (0.032 in, 0.81 mm) steel, and may be flat or embossed. Typical door skin thickness may be in the range of about 0.032 to 0.104 inches (0.81 mm to 2.64 mm). The door includes door edges extending between the periphery of the inner and outer exterior panels. A tornado door is normally an active door which is opened and closed and is positioned within a door frame, and attached to the door frame by a plurality of hinges on one edge of the door. The opposite free edge of the door may include one or more locks, such as a deadbolt or cylindrical lock, disposed within the interior of the door for securing the door in a closed position, and a handle for opening and releasing the door when the lock(s) are collectively in an unlocked position. The interior portion may be hollow and include a plurality of stiffeners for strengthening the inner and outer door skins.

Figure 2:
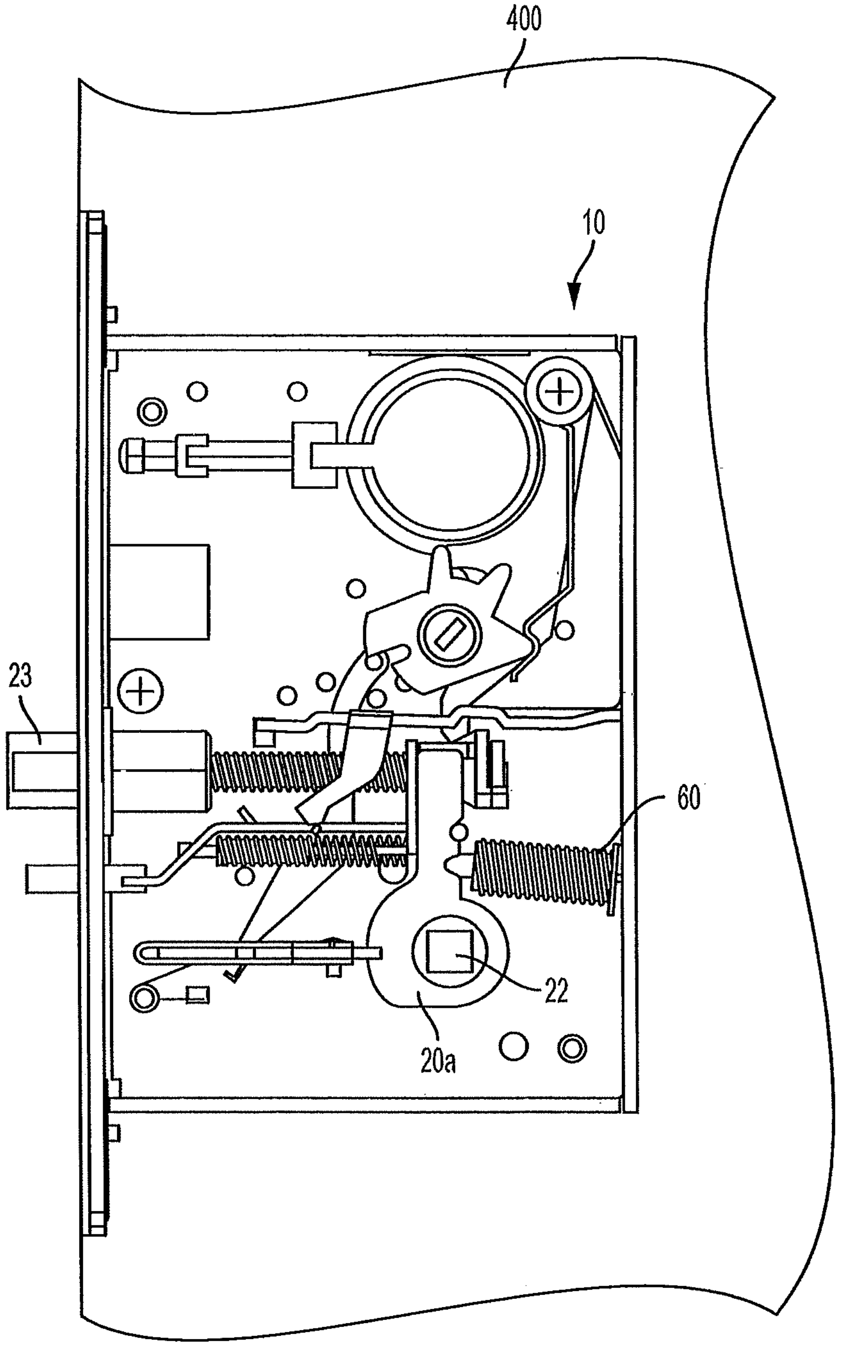
FIG. 2 PRIOR ART
FIG. 2 is a side elevational view of a mortise lock with the cap of the case removed.
Figure 3:
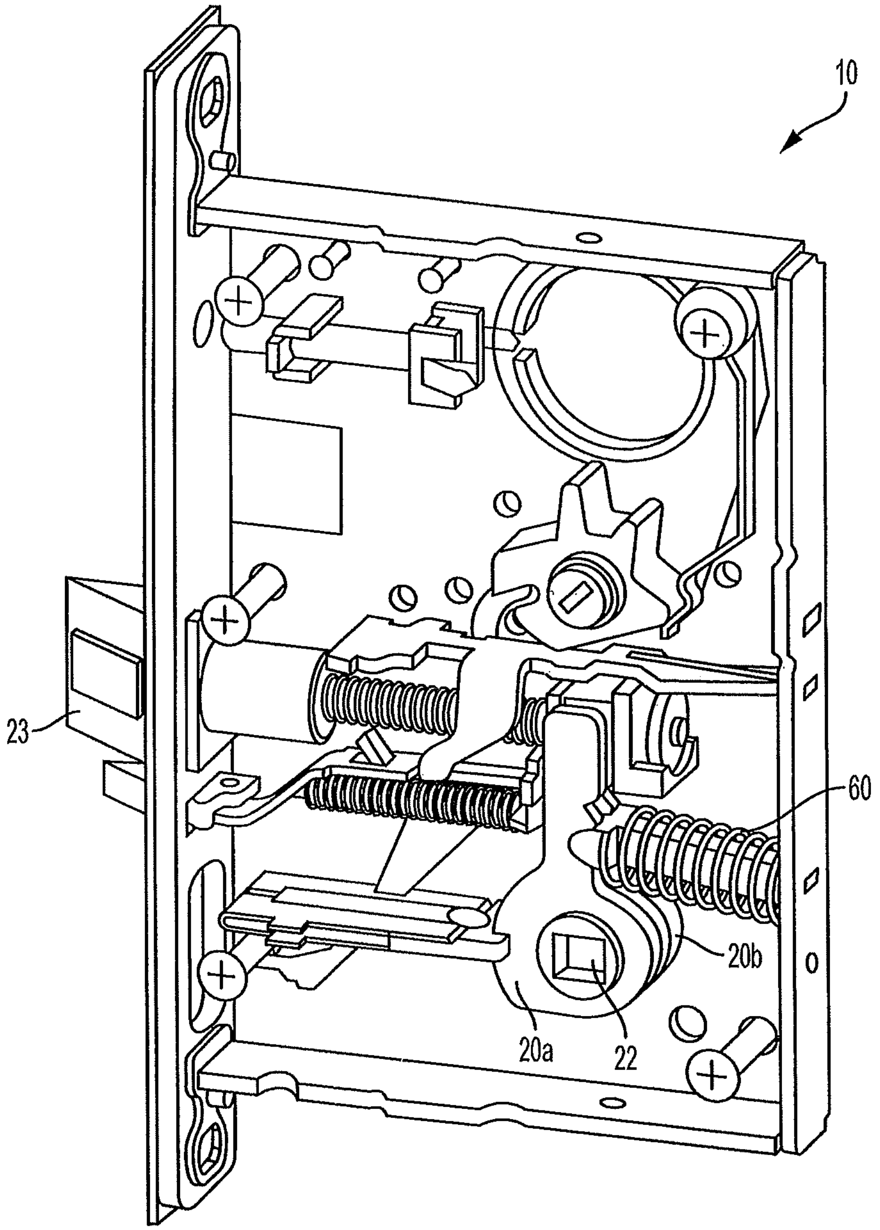
FIG. 3 PRIOR ART
FIG. 3 is a perspective view of a portion of the mortise lock of FIG. 2.
Figure 4:
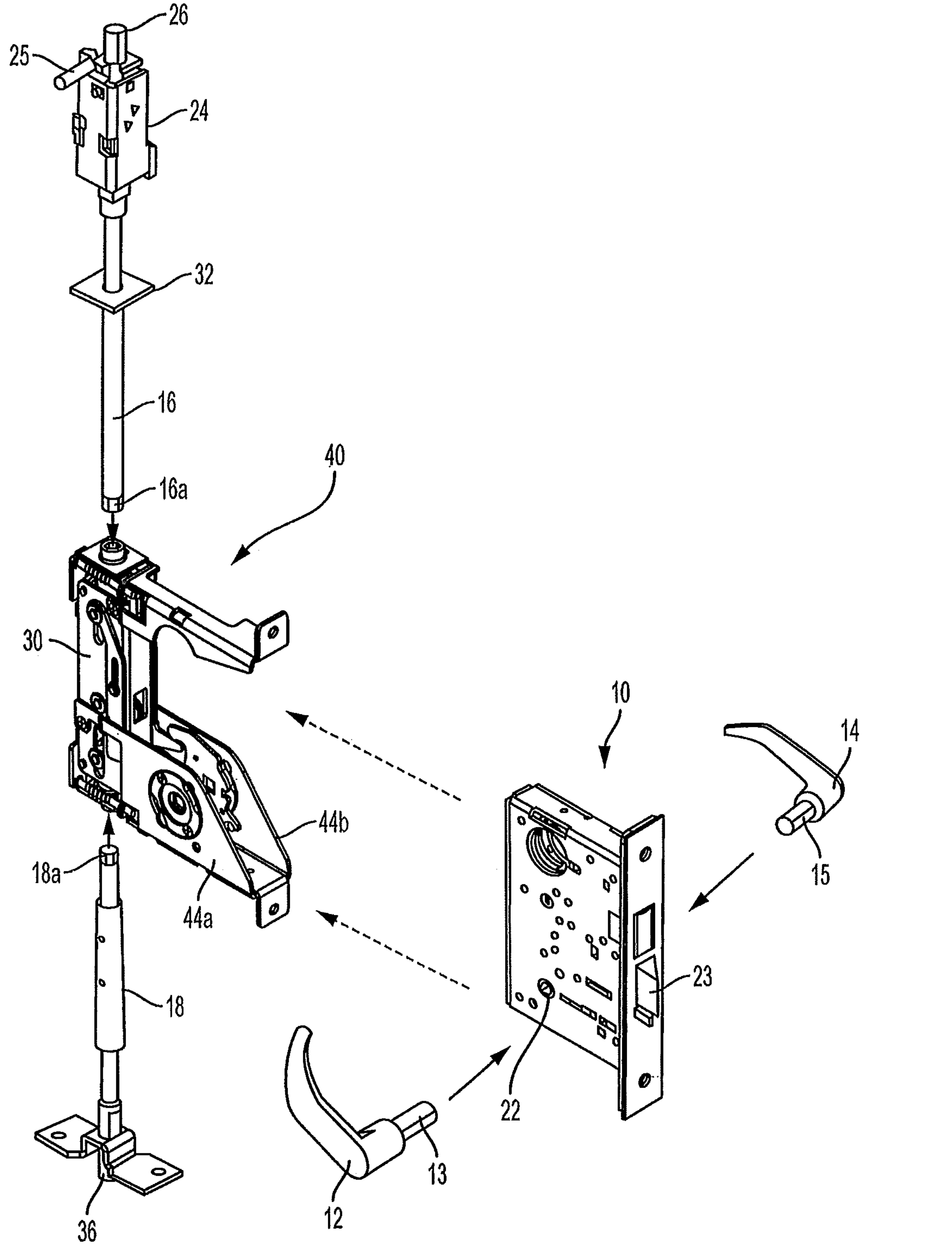
FIG. 4 is perspective exploded view of a mortise lock and vertical rod latch assembly with the adapter of the present invention for enabling a mortise lock with a mid-point latch to actuate a vertical rod door latch.

Referring to FIGS. 2,3 and 4, there is shown a conventional mortise lock of the prior art with the cap on one side of the case removed. The mortise lock is normally employed as a lateral or mid-point latch along a side edge of a swinging door opposite the hinges. Mortise lock 10 is mounted between outer panels or skins of a door 400 (FIG. 2). In relevant part, mortise lock 10 includes a pair of rotatable spindle hubs 20*a*, 20*b* each having a lever or handle opening or slot 22 therein for alignment with handle openings in the outer panels. Each slot 22 receives the shaft of an associated handle or lever (not shown) on the interior and exterior sides of the door, respectively. As shown in FIG. 2, hub 20*a* represents the (cap) side hub on one side of the mortise lock and hub 20*b* represents the (case) side hub on the other side of the mortise lock. Rotation of the lever or handle on either side of the door results in movement of the associated hub 20*a* or 20*b*, thereby retracting a latchbolt 23, which extends from the midpoint of the edge of the door, to an open position from an extended locked position. A hub return spring 60 supports both hubs 20*a*, 20*b* simultaneously by way of contact at or about the upper portion of each spindle hub, and returns the hubs to their normal, unactuated position where the latchbolt 23 is free to return to the extended, engaged and locked position in the strike plate of the door frame (not shown).

Mortise Lock Adapter

An embodiment of the mortise lock adapter and vertical rod interface cassette 40 of the present invention is shown in FIGS. 4-13. The adapter housing 42 has at a rear end a connection and actuation assembly 30' for a vertical rod door latch. The actuator 30' includes a mechanism for moving a vertical rod door latch from an extended locked position to a retracted open position. Although the embodiment of the invention disclosed herein is shown as driving a vertical rod door latch system with rigid vertical rods 16, 18, the adapter device of the present invention can also drive other types of multipoint latch systems, such as cable driven latch systems and the like.

Figure 11:
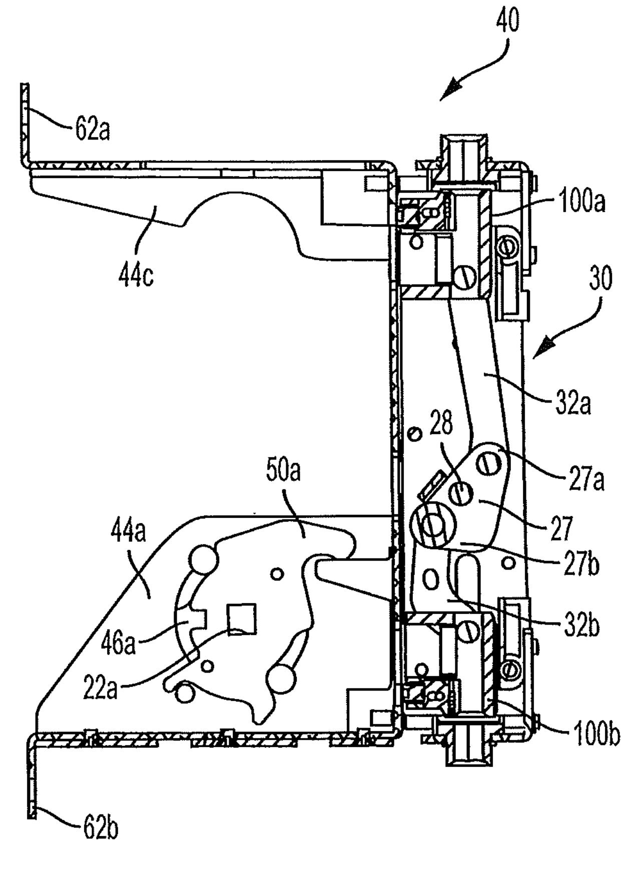
FIG. 11 is a cross-sectional view of the adapter of FIG. 4 along line 10-10 of FIG. 10.
Figure 13:
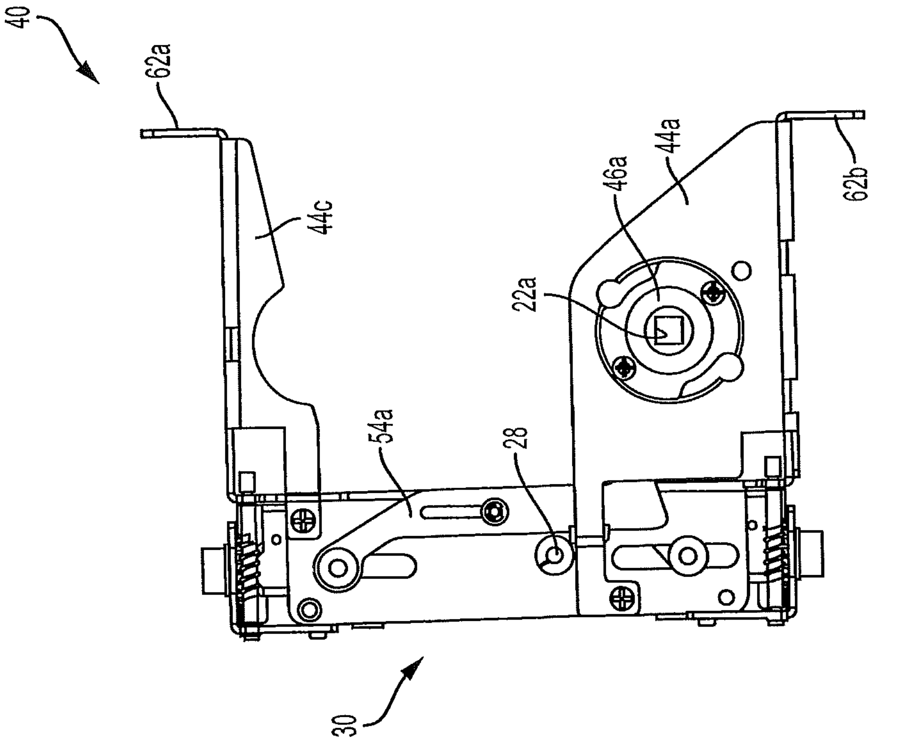
FIG. 13 is a side elevational view of the adapter of FIG. 4.
Figure 12:
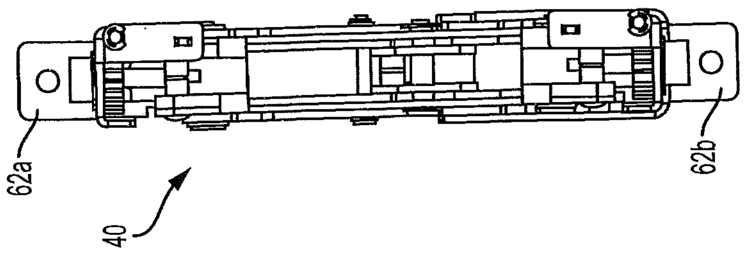
FIG. 12 is a rear elevational view of the adapter of FIG. 4.

The vertical rods 16, 18 extending upward and downward, respectively, are mechanically linked to move together, but in opposite directions, through actuation assembly 30'. A pair of upper and lower rod connectors or carriers 100 are vertically slideable up and down on pins 56, 58, respectively, within slots on opposite sides of housing 42, and secure the lower end 16*a* of upper rod 16 and the upper end 18*a* of lower rod 18, respectively. A double ended lever 27 pivots on pin 28 in housing 42 and has opposite arms 27*a*, 27*b* extending therefrom. Elongated members or links 32*a*, 32*b* connect at one end via pins 56, 58 to upper and lower rod carriers 100, respectively (FIG. 11). At the other end links 32*a*, 32*b* connect via pins 29 to lever arms 27*a*, 27*b*, respectively. Since double ended lever 27 pivots on pin 28 at its midpoint, when the upper vertical rod 16 moves down, the movement is translated via receptacle 100*a*, upper links 32*a*, double ended lever 27, lower links 32*b* and receptacle 100*b* so that the lower vertical rod 18 moves up. The lower vertical rod 18 drives a lower latch having a pin 36 that enters a corresponding strike or opening typically mounted in the floor (not shown). The upper latch is provided with a latch assembly 24 and an upper pin 26 that also enters a corresponding strike or opening in the door frame at the top (not shown). In the vertical rod door latch illustrated, the upper latch assembly 24 may act to hold the pins 26 and 36 in the retracted position when the door is open and to release them when the door is closed using sensing pin 25. The vertical rods 16, 18 may be located inside the door so that they are hidden.

Figure 5:
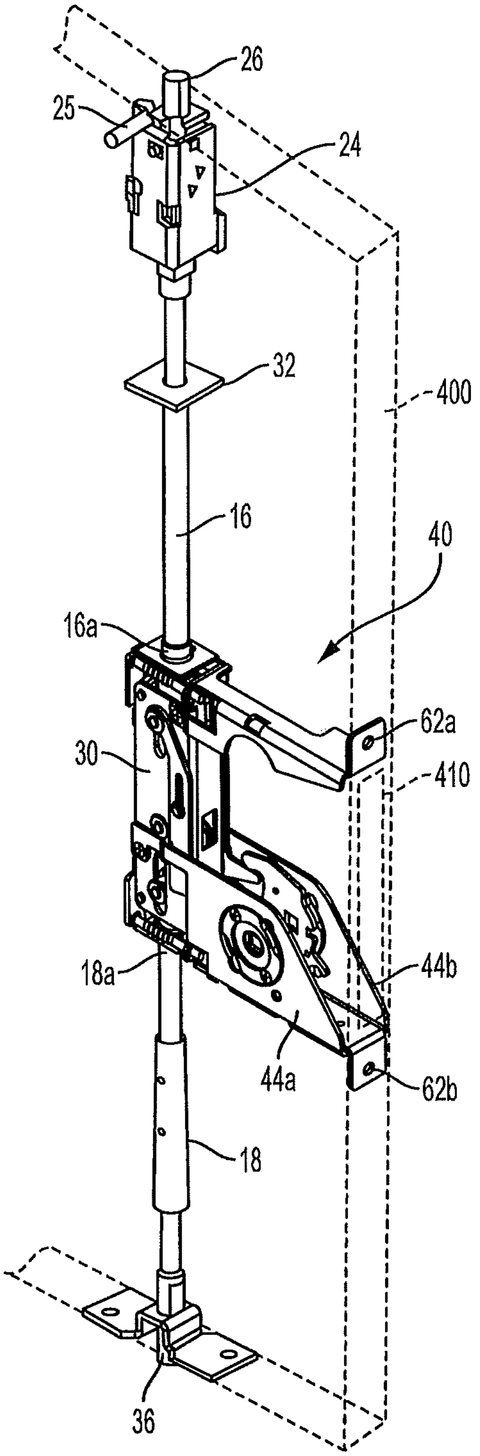
FIG. 5 is a perspective view of a mortise lock and vertical rod latch assembly with the adapter of the present invention for enabling a mortise lock with a mid-point latch to actuate a vertical rod door latch.
Figure 7:
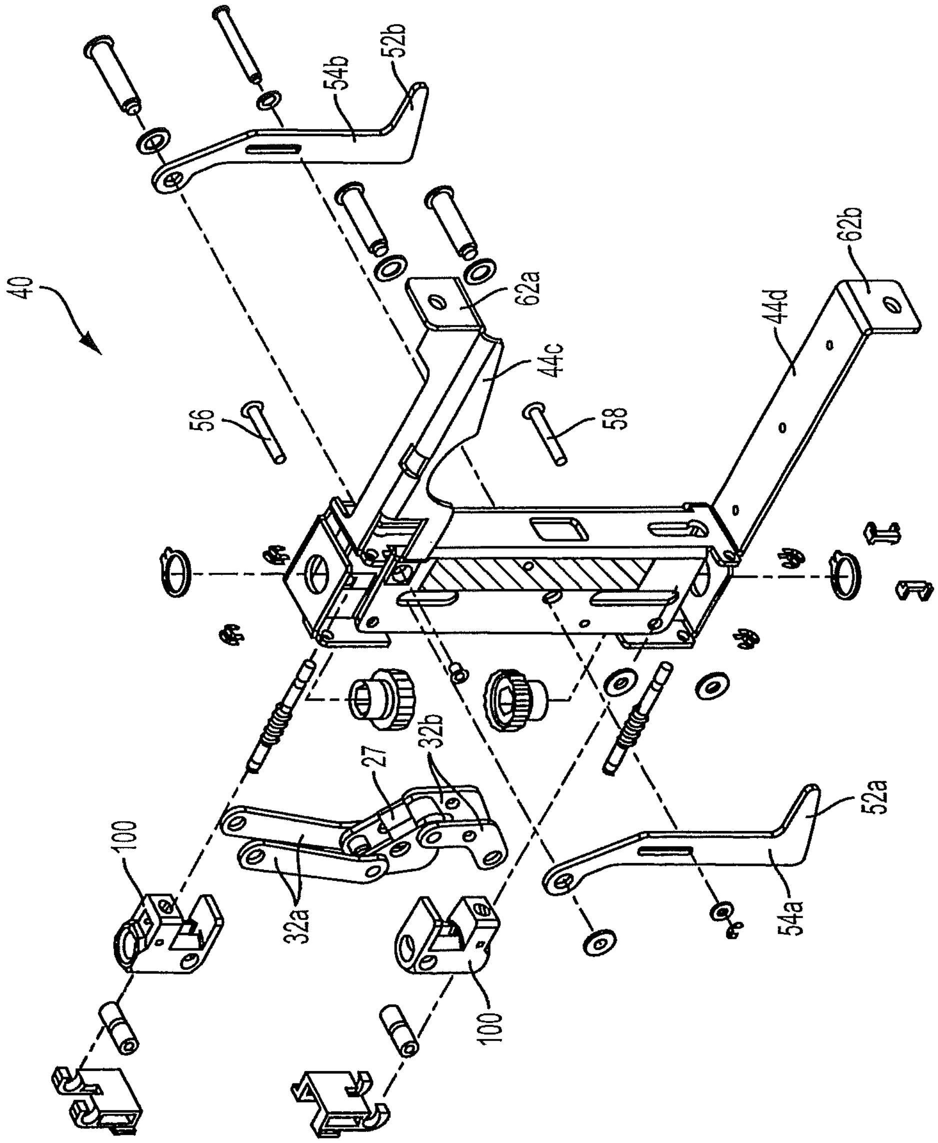
FIG. 7 is an exploded perspective view of the adapter of FIG. 4.
Figure 8:
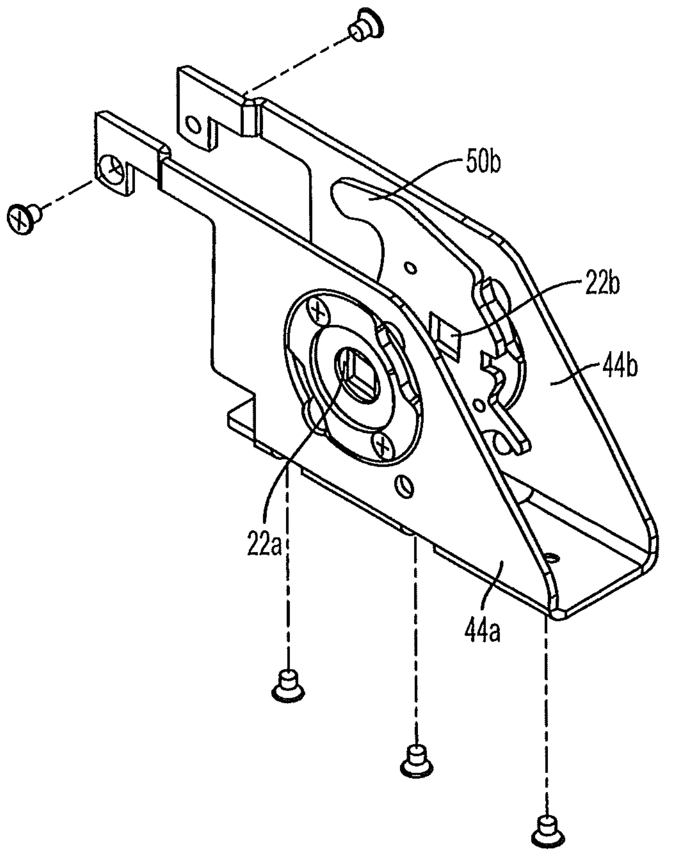
FIG. 8 is a perspective view of the sleeves containing the hubs of the adapter of FIG. 4.
Figure 9:
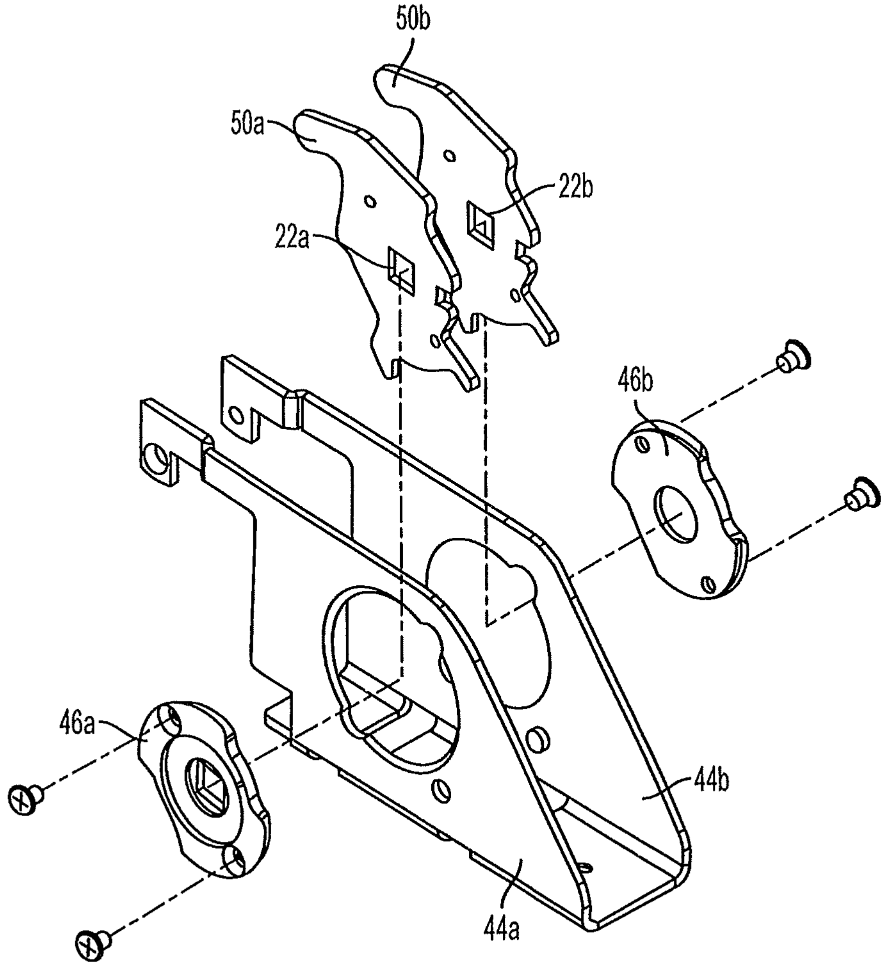
FIG. 9 is an exploded perspective view of the sleeves containing the hubs of the adapter of FIG. 4.
Figure 10:
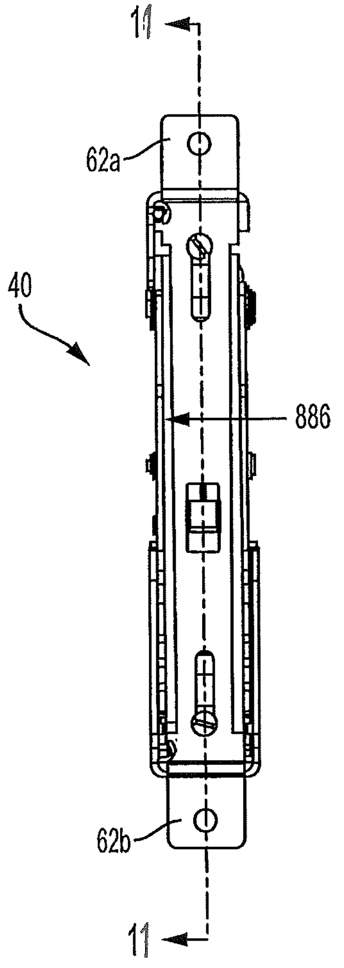
FIG. 10 is a front elevational view of the adapter of FIG. 4.

The adapter 40 housing 42 is constructed as a magazine or cassette as shown in FIG. 5 that may be inserted into a hollow door 400 (or a solid door with a mortise or opening cut into it) and includes a pair of flat, relatively thin sleeves 44*a*, 44*b* positioned in parallel between the inner surfaces of the door outer panels (FIG. 7-9). Arms 44*c*, 44*d* are at the upper and lower ends of the adapter, respectively. Both arms 44*c*, 44*d* extend to the latch or lock edge of the door. In sleeves 44*a*, 44*b* there are provided relatively thin, disk-like rotatable adapter hubs 46*a*, 46*b*, which have central handle shaft openings 22*a*, 22*b*, respectively. Adapter hubs 46*a*, 46*b* are rotatable with respect to sleeves 44*a*, 44*b*, respectively. The distance between the inner surfaces of the hubs is sufficient to permit the width of a mortise lock to slide therebetween. As shown in FIG. 4, the mortise lock 10 is inserted by sliding horizontally into adapter 40 so that each sleeve 44*a*, 44*b* is disposed between a side of the mortise lock and an inner surface of the door exterior panel. The adapter hub openings 22*a*, 22*b* are positioned in alignment with the mortise lock handle shaft opening 22. Common screws may be used at the upper and lower face of lock 10 and through the tabs 62*a*, 62*b* at the ends of adapter arms 44*c*, 44*d* to secure both to the edge of the door (FIG. 5). When the mortise lock is positioned between the sleeves of the adapter housing, the adapter hub opening 22 may receive the shafts 13, 15 of handles 12, 14 respectfully (FIG. 4) passing through the opening in each of the door exterior panels and the adapter hub openings.

Adapter hubs 46*a*, 46*b* are operatively connected to the actuator portion of cassette 40 to retract the vertical rods 16, 18 upon rotation of the hubs. While the mechanism of the prior art actuator 30 may be employed (FIG. 1), the present invention provides an improved actuator 30' which will be described more fully below. As shown in FIGS. 6-9, arms 50*a*, 50*b* extend from adapter hubs 46*a*, 46*b*, respectively, and are moveable therewith. The arms 50*a*, 50*b* act as cams and are engageable with the lower arms 52*a*, 52*b* of elongated members or links 54*a*, 54*b*, respectively, which links are slideably mounted via slots through which pins pass on opposite sides of the exterior of housing 42. The upper ends of links 54*a*, 54*b* are connected via pin 56 to upper rod carrier 100*a*. Upon rotation of the adapter hub openings 22*a*, 22*b* and adapter hubs 46*a*, 46*b* by the handle 12 or 14 shaft 13 or 15, arms 50*a*, 50*b* move downward and bear upon link arms 52*a*, 52*b*, which then moves links 54*a*, 54*b* and rod carrier 100*a* downward as well. Because of such downward movement of upper rod carrier 100*a*, actuation assembly 30' simultaneously lifts lower rod carrier 100*b*, and causes the vertical rods 16, 18 and vertical door latches 26, 36 to move from extended locked positions to retracted open positions. By rotating handles 12 or 14 the vertical rods 16, 18 can be moved to unlatch the upper and lower latches by retracting the upper and lower pins 26, 36 from their respective strike openings.

Because the shafts of handles 12, 14 extend through the adapter hubs 46*a*, 46*b* to the mortise lock hub handle slot 22, simultaneously the mortise lock hubs 20*a*, 20*b* move the mortise lock mid-point latchbolt 23 from an extended locked position to a retracted open position. This unlatches the door from the door frame and floor and allows the door to open.

While rotating lever handles as shown may be employed, push/pull, pushbar and other known types of exit devices, trim or handles may be used, and the term handle is understood to include these as well.

Adjustment of Vertical Rod Latch Projection

Figure 1:
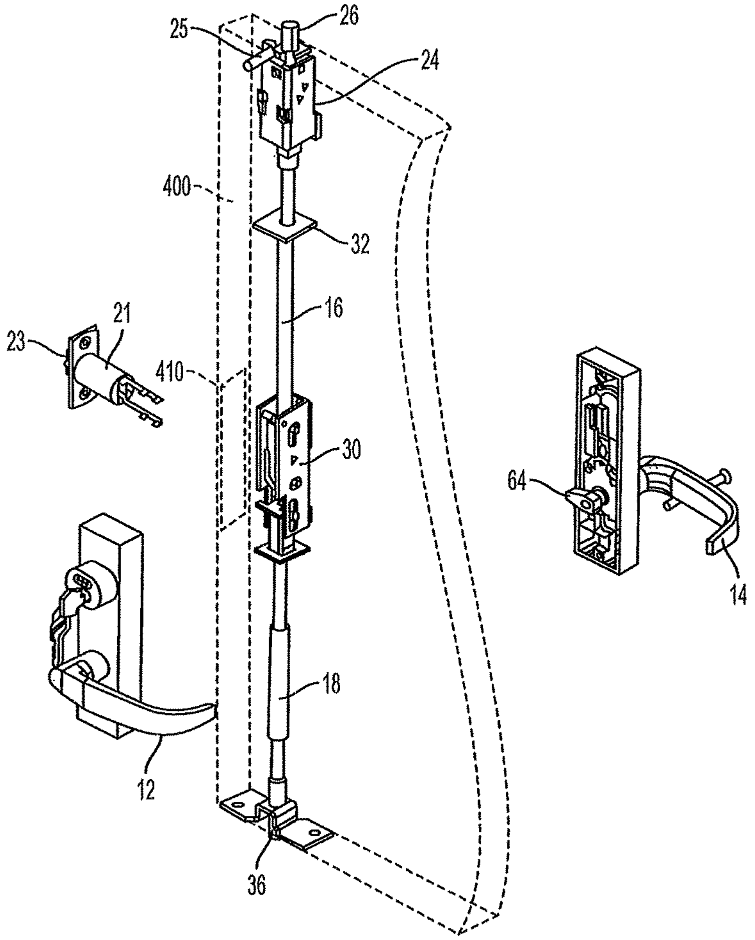
FIG. 1 PRIOR ART
FIG. 1 is a perspective, partially exploded view of an exemplary multi-point latching system showing door handles and mid-point and vertical latches for a swinging door.
Figure 14:
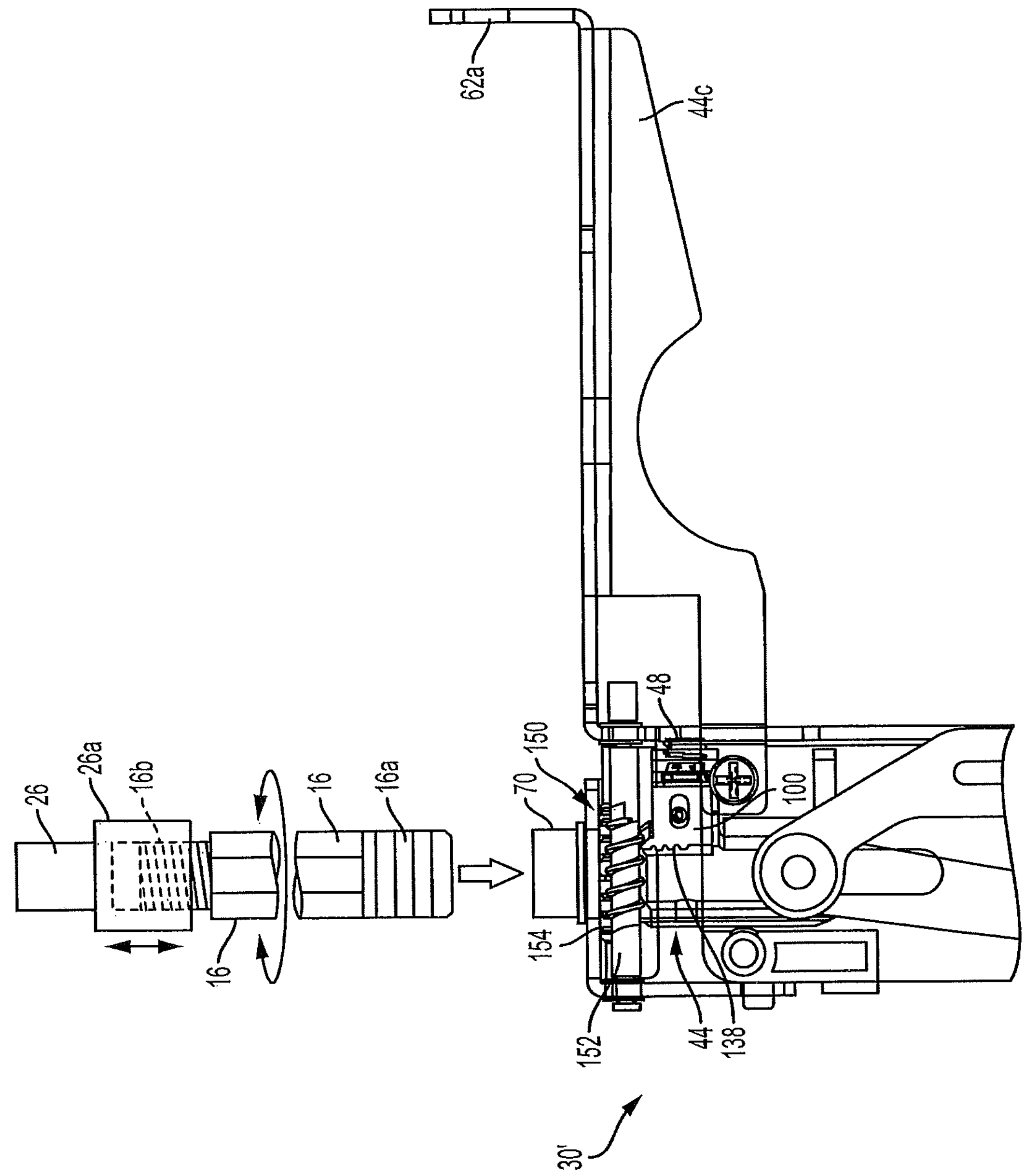
FIG. 14 is a side view of the top portion of the actuator assembly of FIG. 6.
Figure 15:
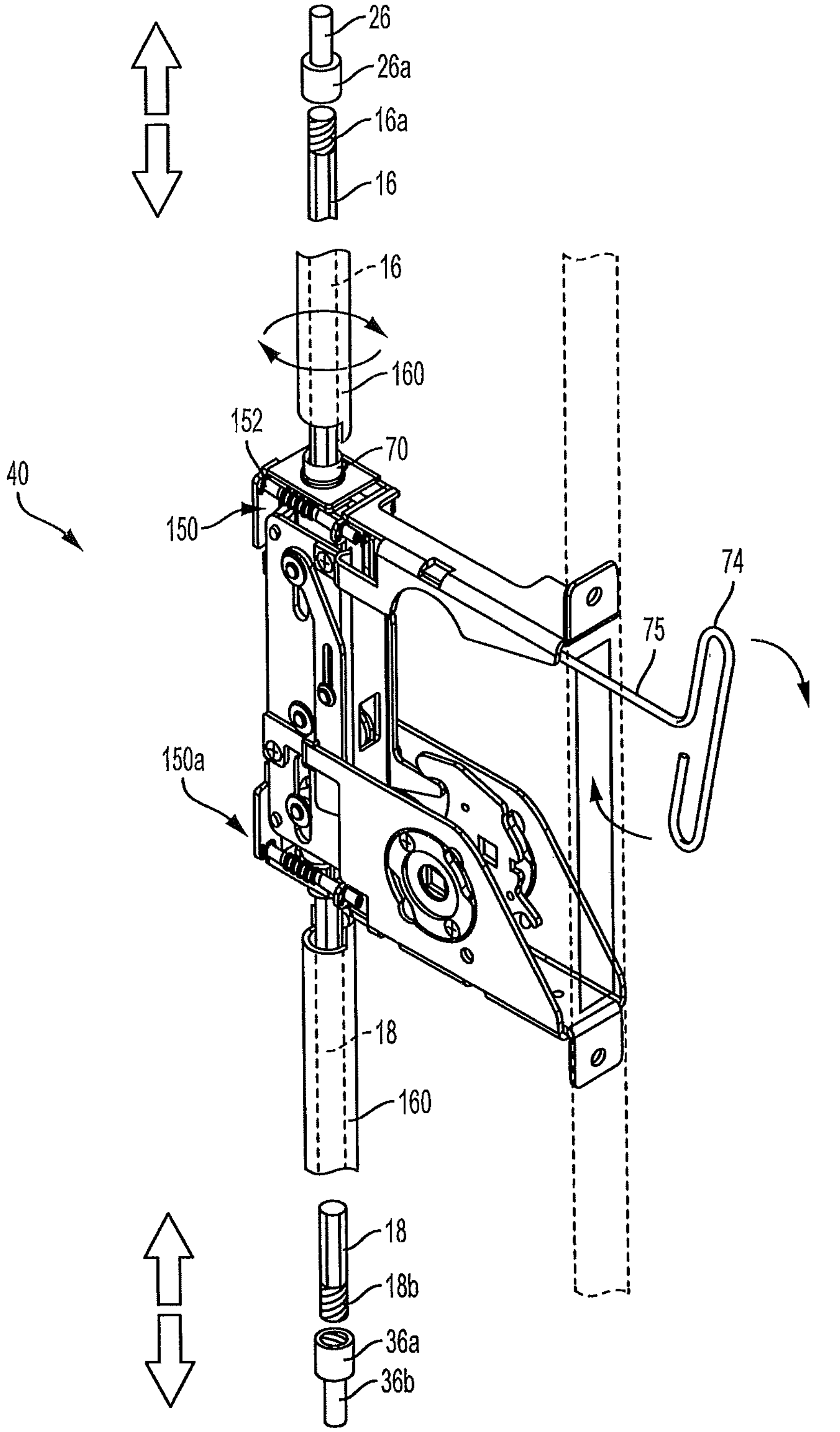
FIG. 15 is a perspective view of the actuator assembly of FIG. 14 in mechanical communication with upper and lower vertical rods, showing a method of adjusting the upper vertical rod latch projection.
Figure 16:
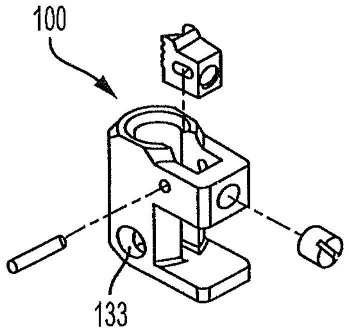
FIG. 16 is an exploded perspective view of the rod carrier used in the adapter of FIG. 7.
Figure 17:
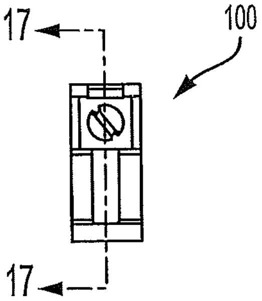
FIG. 17 is a front elevational view of the rod carrier used in the adapter of FIG. 7.
Figure 18:
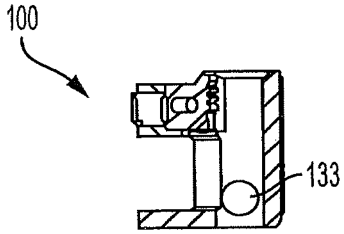
FIG. 18 is a side cross-sectional view of the rod carrier along line 17-17 of FIG. 17.
Figure 19:
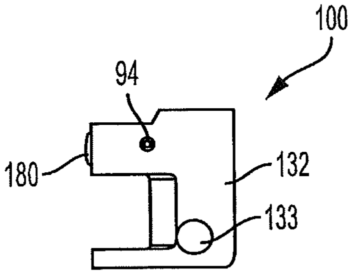
FIG. 19 is a side view of the rod carrier of FIG. 16.

An apparatus and method for adjusting a vertical rod latch projection in a multi-point latching system is shown in FIGS. 1 and 14-15. This apparatus and method may be used with the actuator of the adaptor and vertical rod interface cassette 40 shown in FIGS. 4-13, or may be used with the actuator of an otherwise conventional multi-point locking system as shown in FIG. 1.

The embodiment of the multi-point locking system shown in FIG. 1 has an exterior lever handle 12 and an interior lever handle 14 which are connected together to drive a cam or arm 64 when either handle is turned. Cam 64 drives, via actuator assembly 30, a vertical rod door latch having an upper vertical rod 16 and lower vertical rod 18. Simultaneously, cam 64 also drives a mid-point or lateral latch assembly 21 which drives a latchbolt or pin 23 extending through the side door edge opposite the hinge edge that enters a corresponding strike or opening typically mounted in the mid-point of a door frame. As before, any of several known types of knob or lever handles, trim or exit (e.g., push bar or push rail) devices can be used to operate mid-point latch assembly 21 and actuator assembly 30, and these will be collectively referred to herein as "handles."

The vertical rods 16, 18 are mechanically linked in a conventional manner to move together, but in opposite directions through actuator assembly 30. When the upper vertical rod 16 moves down, the lower vertical rod 18 moves up. The lower vertical rod 18 drives a lower latch having a pin or latch 36 extending through the lower door edge that enters a corresponding strike or opening typically mounted in the floor. The upper latch is provided with a latch assembly 24 and an upper pin or latch 26 extending through the upper door edge (not shown) that also enters a corresponding strike or opening in the top of the door frame. In the vertical rod door latch illustrated, the upper latch assembly 24 acts to hold the pins 36 and 26 in the retracted position when the door is open and to release them when the door is closed using sensing pin 25. The vertical rods 16, 18 are typically located inside the door so that they are hidden.

By rotating or otherwise operating handles 12 or 14, the vertical rods 16, 18 can be moved to unlatch the upper, lower and mid-point latches by retracting the upper, lower and mid-point pins 26, 36, 23 from their respective strike openings. This unlatches the door from the door frame and floor and allows the door to open.

The actuator assembly of the present invention eliminates the need to stand on a ladder to adjust the upper door latch or take down the door to adjust depth of vertical latch projection by permitting adjustment of the projection of a vertical rod latch into the corresponding strike opening in situ while the door is hung, while also ensuring that latch projection adjustments for the top and/or bottom vertical rod latch(es) are made from the center of the door.

An embodiment of the adjustable vertical rod latch is shown in the actuator assembly of the adapter and vertical rod interface cassette in FIGS. 4, 14 and 15. As best shown in FIG. 14, actuator assembly 30' comprises a connector 100*a* for securing the upper vertical rod lower end 16*a* to the actuator. In this embodiment, connector 100*a* may comprise and opening for receiving the rod end 16*a*, a securing member for mechanically engaging the rod end, and a mechanism for urging the securing member against the rod lower end to retain the rod 16 in the connector. As illustrated in FIG. 14, a securing member 136 is disposed in the connector and is moveable in directions normal to the longitudinal axes of the rods, toward and away from the rod end 16*a*. Securing member 136 includes on one side comparable teeth 138 for mechanically engaging the threads on the rod end 16*a* when moved into contact therewith. On the other side, the securing member has a surface on which set screw 48 bears. Upon tightening rotation, the set screw 48 urges the securing member 136 against the rod end 16*a* to retain the rod in the connector 100*a*. It should be understood by those skilled in the art that the present invention is not limited to a connector as described, and that other types of connections may also be used to secure the vertical rod to the actuator, such as those described further herein below.

Figure 6:
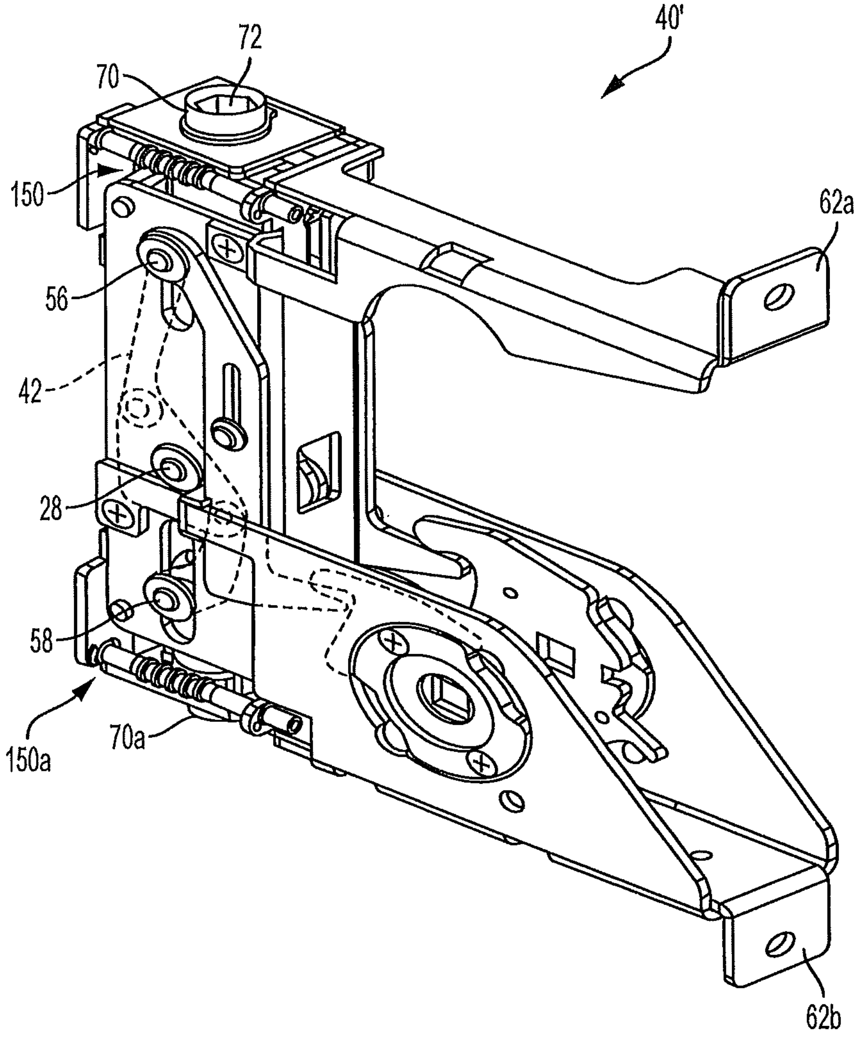
FIG. 6 is a close-up perspective view of the adapter of FIG. 4.

The actuator assembly of the present invention permits the depth of the top and bottom vertical latch projection(s) to be adjusted while the door is hung and prior to securing the lower end 16*a* of the upper vertical rod 16 and the upper end 18*a* of the lower vertical rod 18, respectively, to the actuator 30'. As shown in FIGS. 14 and 15, actuator assembly 30' further comprises a driver for rotating the receiver in the form of worm drive 150 integral with or coupled to the top end of the assembly housing 42 for adjustment of the upper vertical rod 16. Worm drive 150 consists of a worm screw 152 with teeth engaged with those of a worm wheel 154, with the worm screw axis being rotatable normal to the longitudinal axis of the vertical rod. A receiver 70 is coupled to the worm wheel 154 and has an opening 72 which is adapted to engage an outer surface of upper vertical rod 16 when inserted therein (FIGS. 6 and 15). In the embodiment shown in FIGS. 14 and 15, receiver opening 72 and rods 16, 18 have correspondingly-shaped hexagonal or otherwise non-circular cross-sections comprising a plurality of mating flats.

As described above with respect to prior art multi-point lock systems, the top end 16*b* of the upper vertical rod 16 drives an upper latch having a pin or latch 26 extending through a corresponding strike or opening in the top of the door frame (not shown). The vertical rod has a threaded coupling with the door latch to adjust the distance between the two. Rod top end 16*b* is helically threaded and screws into a comparably-threaded lower end 26*a* of latchbolt 26. Latchbolt 26 may move up and down, but is restrained from rotation. As shown in FIG. 14-15, actuation of worm drive 150 rotates the upper vertical rod 16 to cause lower end 26*a* and latchbolt 26 to be adjustable in upward and downward directions, respectively, to adjust a depth of the latch projection with respect to the opening in the strike (FIG. 14). In at least one embodiment of the present invention, actuation of the worm drive 150 may be accomplished by use of a tool or other device such as a T-wrench 74 having a hex key or an Allan wrench type arm 75 which may be inserted into a corresponding opening in an end of worm screw 152. Arm 75 is shown as being of sufficient length to extend from the side edge of the door having the mortise pocket and within sleeve 44*c* to the worm screw 152 of the receiver driver 150. Such adjustment of the drive and the latch projection may be made before the mortise lock is inserted into the vertical rod interface cassette 40. Wrench 74 may be rotated in a clockwise or counterclockwise direction around arm 75 axis normal to the longitudinal axis of the rod 16, as necessary, to adjust the depth of the vertical latch projection into the corresponding strike. Rotation of the worm drive in one direction will adjust the height of the vertical rod in the direction of the strike, while rotation in the opposite direction will retract the vertical rod toward the actuator assembly, thereby shortening the depth of the latch projection into the strike opening.

A corresponding worm drive 150*a* and receiver 70*a* may be integral with or coupled to the bottom end of the assembly housing 42 (FIG. 15) for rotational adjustment of the lower vertical rod 18 by threaded end 18*b* in threaded upper end 36*a*, and adjustment up and down of projection of latch 36 into a corresponding strike or opening typically mounted in the floor (not shown). In contrast to multi-point lock systems of the prior art, the configuration of the actuator assembly of the present invention ensures that latch projection adjustments for the top and/or bottom vertical rod latches are from the center actuator, rather than at the upper and lower latches themselves. Each of the upper and lower vertical rods may be adjusted individually via their respective worm drive 150, 150*a* to a desired depth of latch projection into the corresponding opening or strike. After the top and/or bottom latch projection(s) have been adjusted to a desired depth, the vertical rods may then be secured in that position in the actuator assembly, such as via the set screw and connector 100 shown in FIG. 14.

Connector/Carrier for Verifying Retention of the Vertical Rods

An embodiment of the apparatus and method for verification of retention of vertical rods in a multi-point latching system is shown in FIGS. 16-27.

Figure 20:
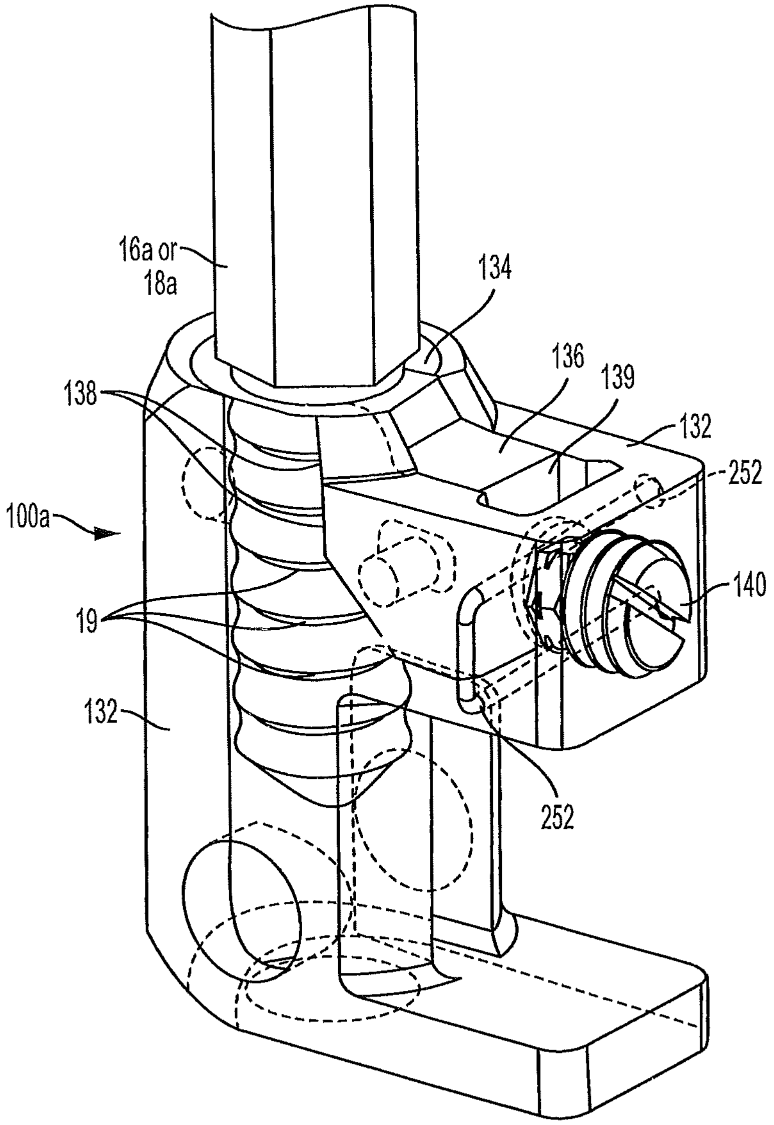
FIG. 20 is a perspective view of one embodiment of the retention system for the vertical rod door latch showing a rod carrier employing a set screw and spring detent for retaining the securing member against the vertical rod end.
Figure 21:
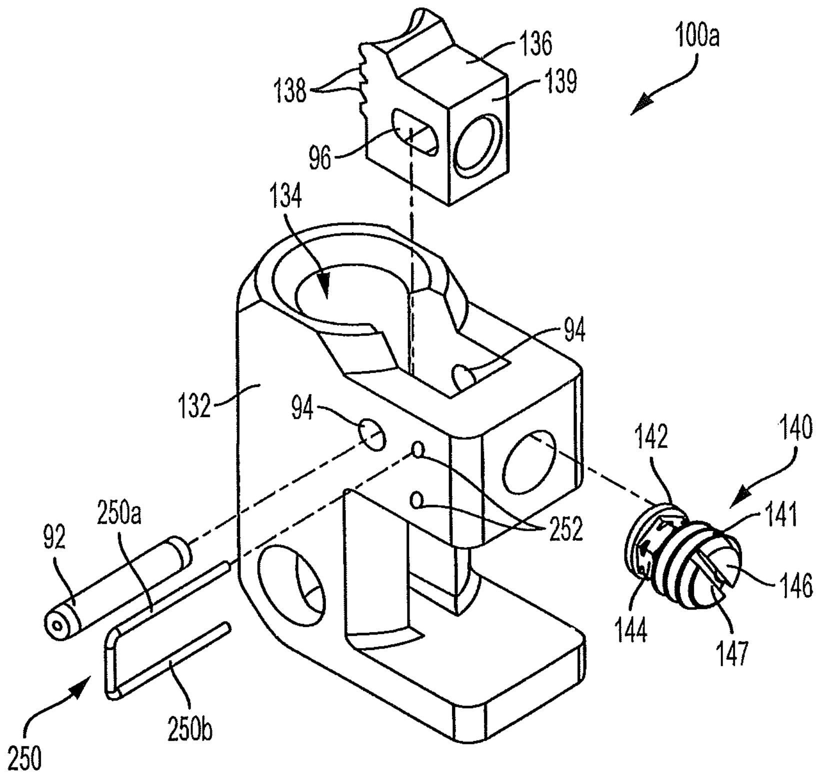
FIG. 21 is a perspective partially exploded view of the embodiment of the retention system of FIG. 20.
Figure 26:
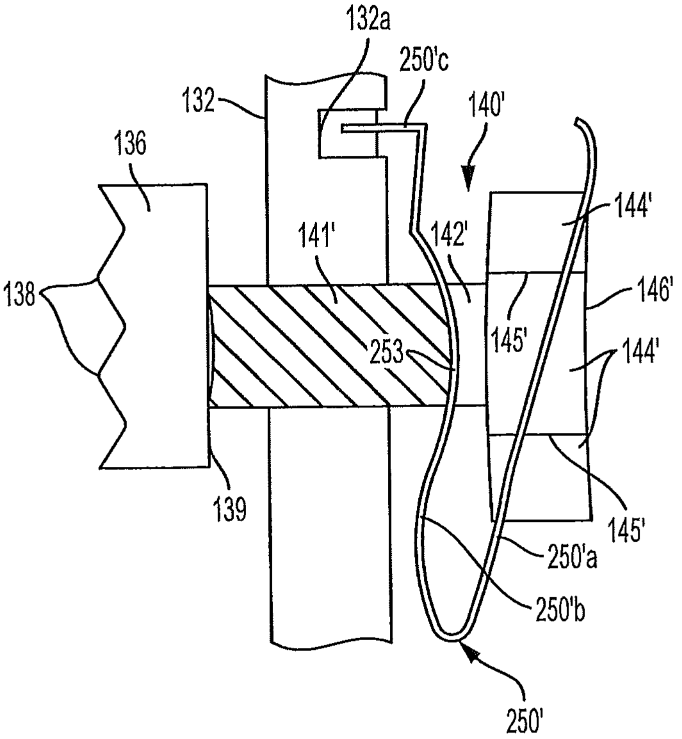
FIG. 26 is a side elevational view of another embodiment of the retention system for the vertical rod door latch employing a set screw and spring detent for retaining the securing member against the vertical rod end.
Figure 27:
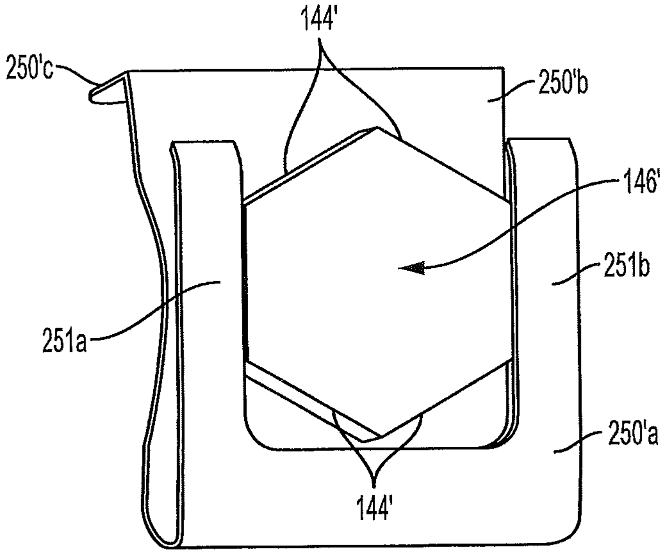
FIG. 27 is a perspective view of the set screw head and spring detent of the embodiment of the retention system of FIG. 26.
Figure 28:
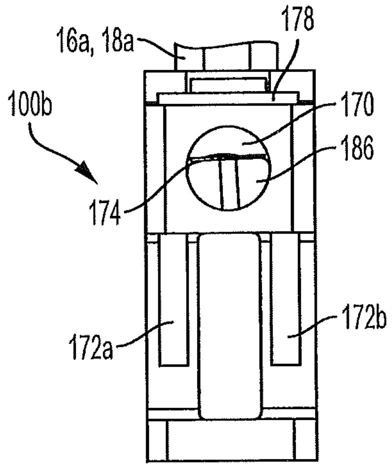
FIG. 28 is a front elevational view of one embodiment of the retention system for the vertical rod door latch showing a rod carrier employing a button and gate member for retaining the securing member against the vertical rod end.
Figure 29:
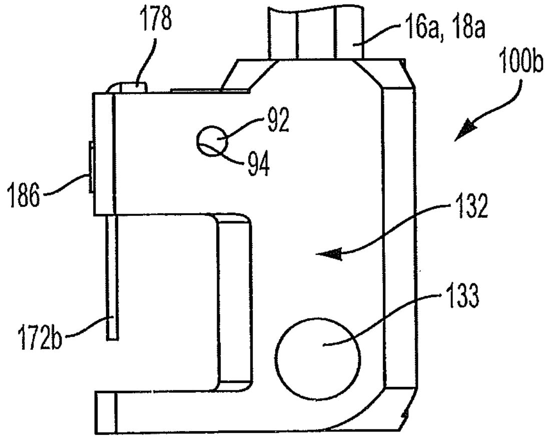
FIG. 29 is a side elevational view of the rod carrier retention system embodiment of FIG. 28.
Figure 30:
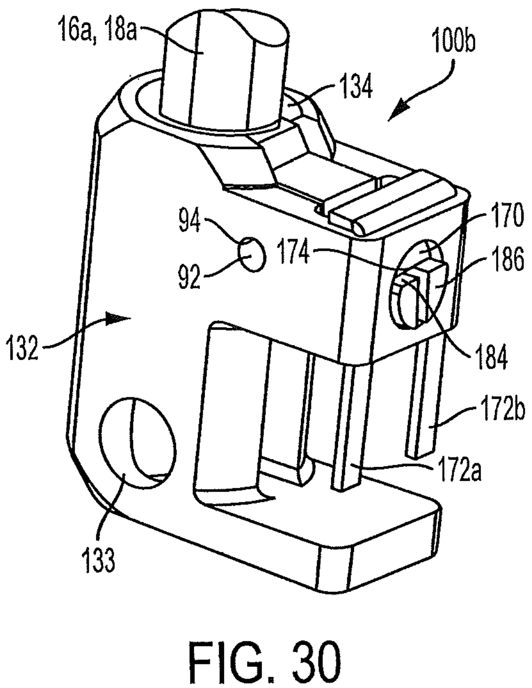
FIG. 30 is a perspective view of the rod carrier retention system embodiment of FIG. 28.
Figure 31:
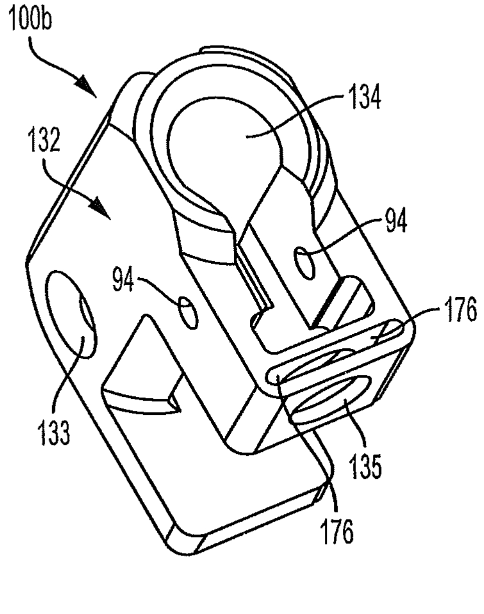
FIG. 31 is a perspective view of the housing of the rod carrier retention system embodiment of FIG. 28.

The connection between vertical rods 16, 18 and vertical rod connection or actuator assembly 30' is shown as being made via a pair of connectors or carriers 100 in one embodiment shown in FIGS. 20 and 21, and in another embodiment shown in FIGS. 26 and 27. These upper and lower carriers 100*a* or 100*b* may be used in place of carriers in the embodiments of the invention described previously. In each instance, the ends 16*a*, 18*a* of the vertical rod may have a series of adjacent threads or grooves 19 extending around the periphery, and are captured and secured by the carriers 100*a*, 100*b* to the actuator 30' to move the vertical rod door latch pins 36, 26 between engaged and disengaged positions.

Figure 22:
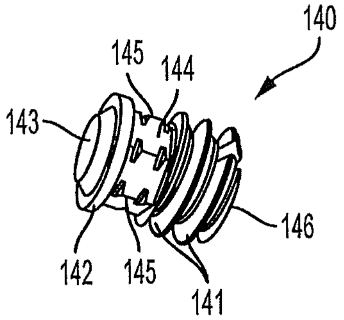
FIG. 22 is a perspective view of the set screw employed in the embodiment of the retention system of FIG. 20.
Figure 23:
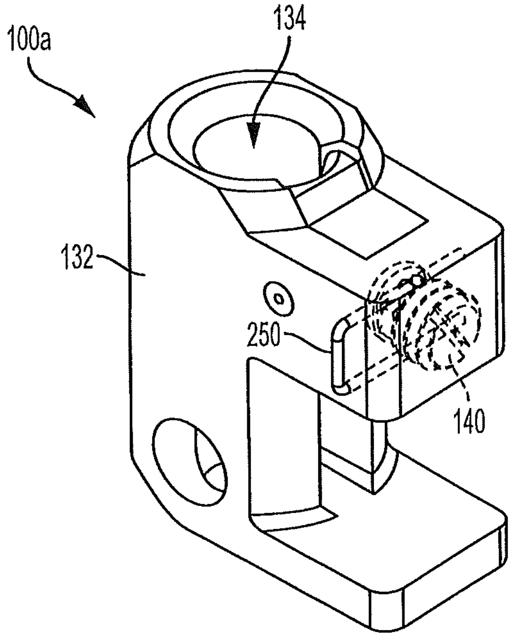
FIG. 23 is a perspective view of the carrier used in the embodiment of the retention system of FIG. 20 without the vertical rod.

As shown in FIGS. 20-22, the carrier housing 132 has an opening 134 for receiving the end 16*a*, 18*a* of the rod or other member connected to the vertical latch pins 36, 26. A securing member 136 is disposed in the carrier and is moveable in directions normal to the longitudinal axes of the rods 16, 18, toward and away from the rod ends 16*a*, 18*a*. Such inward and outward movement is guided by pin 92 anchored in openings 94 on either side of carrier housing 132 and extending through a slot 96 passing through securing member 136. Securing member 136 includes on one side comparable teeth 138 for mechanically engaging the grooves 19 on the rod ends 16*a*, 18*a* when moved into contact therewith. On the other side the securing member has a surface 139 on which a set screw 140 (FIG. 20-25) or 140' (FIGS. 26 and 27) bears.

The set screw 140 or 140' has threads and is received in a comparably threaded opening in the housing oriented in a direction perpendicular to the vertical rod axis. The set screw embodiment 140 depicted in FIGS. 20 and 21 has no head, and includes a screwdriver blade-receiving slot 147 at one end 146 of the threaded portion and an unthreaded shank portion 142 (FIG. 21) at the opposite end. Upon tightening rotation the set screw 140, 140' urges the securing member 136 against the rod end 16*a*, 18*a* to retain the rod in the carrier 130. Carrier 130 may be secured to the operative components at the upper and lower ends of actuator assembly 30' by any suitable means or connection.

The set screw 140 shown in FIGS. 20-25 has a one or more detents or indentations 144 in what would otherwise be the cylindrical surface of the shank. The indentations 144 in this embodiment comprise a plurality of flat surface portions around the periphery of the shank portion, shown here as having a hexagonal configuration with six (6) flat surfaces. The detents or flat surfaces 144 are separated by corners 145. The flat surfaces 144 may extend along all of or only a portion of the length of the set screw shank portion 142. Set screw 140 also has on the end of shank portion 142 a projection 143 that is configured to fit into a comparable recess 137 in surface 139 of the securing member.

The carrier housing 132 includes openings 252 through which a pair of essentially parallel spring legs 250*a*, 250*b* extend perpendicularly to both the vertical rod axis and the set screw axis (FIG. 21). The spring legs 250*a*, 250*b* may be made of spring steel wire. The set screw shank portion 142 is disposed between the spring legs 250*a*, 250*b*, and the surfaces of the spring legs are loaded to normally bear against the screw shank portion. The individual spring legs 250*a*, 250*b* may be constructed similar to simple beams supported in housing openings on each end (FIG. 20) or constructed similar to a cantilever beam supported on one end only (FIG. 21).

Figure 24:
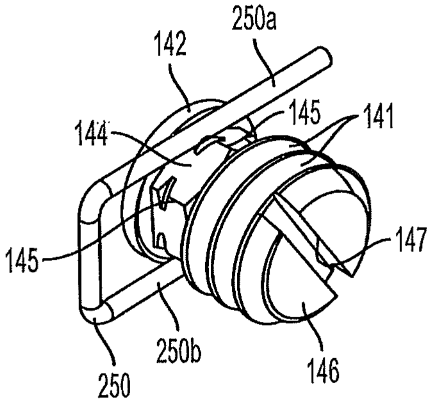
FIG. 24 is a perspective view of the set screw and spring detent of the embodiment of the retention system of FIG. 20.
Figure 25:
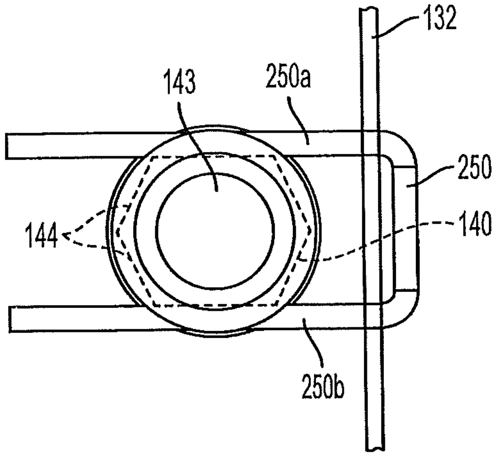
FIG. 25 is a cross sectional view of the shank of the set screw and spring detent of the embodiment of the retention system of FIG. 20.

In the method aspect of this embodiment of the present invention, as the set screw 140 is rotated into a tightened position toward the securing member 136 urging it against the rod end 16*a*, 16*b*, the spring legs 250*a*, 250*b* are moved outward by the corners 145 between the screw shank flat portions 144 so that the screw must overcome the spring force to turn (FIG. 24). As a result, the user feels the alternating spring resistance upon each ⅙ rotation of the set screw. The changing resistance during rotation of the screw 140 as the force of the spring 250 alternately decreases and increases between the flat portions and the corners, respectively, acts as a series of spring-loaded detents which the user feels as the screw is tightened. When the set screw 140 is tightened into final position of the securing member 136 to retain the rod end 16*a*, 18*a* in the carriers 100*a*, 100*b*, the user feels the detent position in which the spring resistance decreases, and the spring moves relatively inward to a position where the spring legs 250*a*, 250*b* bear directly against and essentially make full contact with the opposite flat surface portions 144 on the set screw shank (FIG. 21). The set screw 140 is then left in this position, and the spring 250 force acts to resist and restrict loosening rotation of the screw, thereby keeping it in position and retaining the rod end in the carrier housing.

In another embodiment shown in FIGS. 26 and 27, carrier housing 132 is substantially the same as that of the preceding embodiment, but the set screw detent indentations and spring are of a different configuration. The set screw 140' has a threaded portion 141' with an end that bears against surface 139 of the securing member 136. At the opposite end the set screw 140' has a shank 142' and head 146' extending therefrom, shown as an otherwise conventional hex head with six flat surface portions 144' extending around the head periphery, separated by corners 145'.

As seen in the side view in FIG. 26, spring 250' is in the form of a folded strip with a double cantilever configuration. A leg **250'*c* is secured within a slot opening 132*a* in housing 132 and a first strip portion 250'*b* extends in a direction somewhat perpendicular to the axis of the screw 140', with an opening 253 through which the screw threads 141' and shank 142' may pass. At the end of the first cantilever strip portion 250'*b* opposite the leg 250'*c* the strip folds back in the opposite direction somewhat perpendicular to the screw axis and forms a second cantilever strip portion 250'*a* with a pair of parallel forks or legs 251*a*, 251*b* on either side of the screw head 146'. In an unloaded or undeformed position (FIG. 26) the spring legs 251*a*, 251*b* are positioned adjacent to and in the plane of the screw head 146', so that the legs 251*a*, 251*b* essentially contact and bear against flat surface portions 144'** on opposite sides of the screw head.

In the method aspect of this embodiment, the second cantilever portion **251'*a* of the spring may be moved toward the securing member 136 by a hand or tool into a loaded or deformed position, wherein the spring is below and clears the set screw head 146', so that the screw head may be rotated. The set screw 140' is then tightened into final position against the securing member 136 to retain the rod end 16*a*, 18*a* in the carriers 100*a*, 100*b*, and the head 146' is left in a position where the flat side portions 144' are parallel to the spring legs 251*a*, 251*b*. Upon release the second cantilever portion 250'*a* of the spring 250 moves upward away from the securing member to the undeformed position (FIG. 26) wherein the legs 251*a*, 251*b* engage the flat surface portions 144' on opposite sides and capture the screw head 146' to prevent it from rotating. In this position the legs 251*a*, 251*b* apply a force to restrict loosening rotation of the screw 140'**, thereby keeping it in position and retaining the rod ends in the carrier housing. The position of the detent provided by the spring on the flats may be confirmed by feel, thereby verifying that the rod is properly retained in the carrier.

A further embodiment of the connector/carrier securing the vertical rod in the actuator is shown in FIGS. 28-34, where the connection between vertical rods 16, 18 and vertical rod connection or actuator assembly 30' is shown as being made via a pair of connectors or rod carriers 100'. The ends **16*a*, 18*a* of the vertical rod may have a series of adjacent grooves 19 extending around the periphery, and are captured and secured by the carrier 100' to the actuator 30' to move the vertical rod door latch pins 36, 26 between engaged and disengaged positions. The carrier housing 132 has an opening 134 for receiving the end 16*a*, 18*a* of the rod or other member connected to the vertical latch pins 36, 26. A securing member 136 is disposed in the carrier and is moveable in directions normal to the longitudinal axes of the rods 16, 18, toward and away from the rod ends 16*a*, 18*a*. Such inward and outward movement is guided by pin 92 anchored in openings 94 on either side of carrier housing 132 and extending through a slot 96 passing through securing member 136. Securing member 136 includes on one side comparable teeth 138 for mechanically engaging the grooves 19 on the rod ends 16*a*, 18*a* when moved into contact therewith. On the other side the securing member has a surface 139 on which the force applied by button 180 bears. Securing member surface 139 has a depression or recess 137 for receiving a flexible member 171**.

Figure 32:
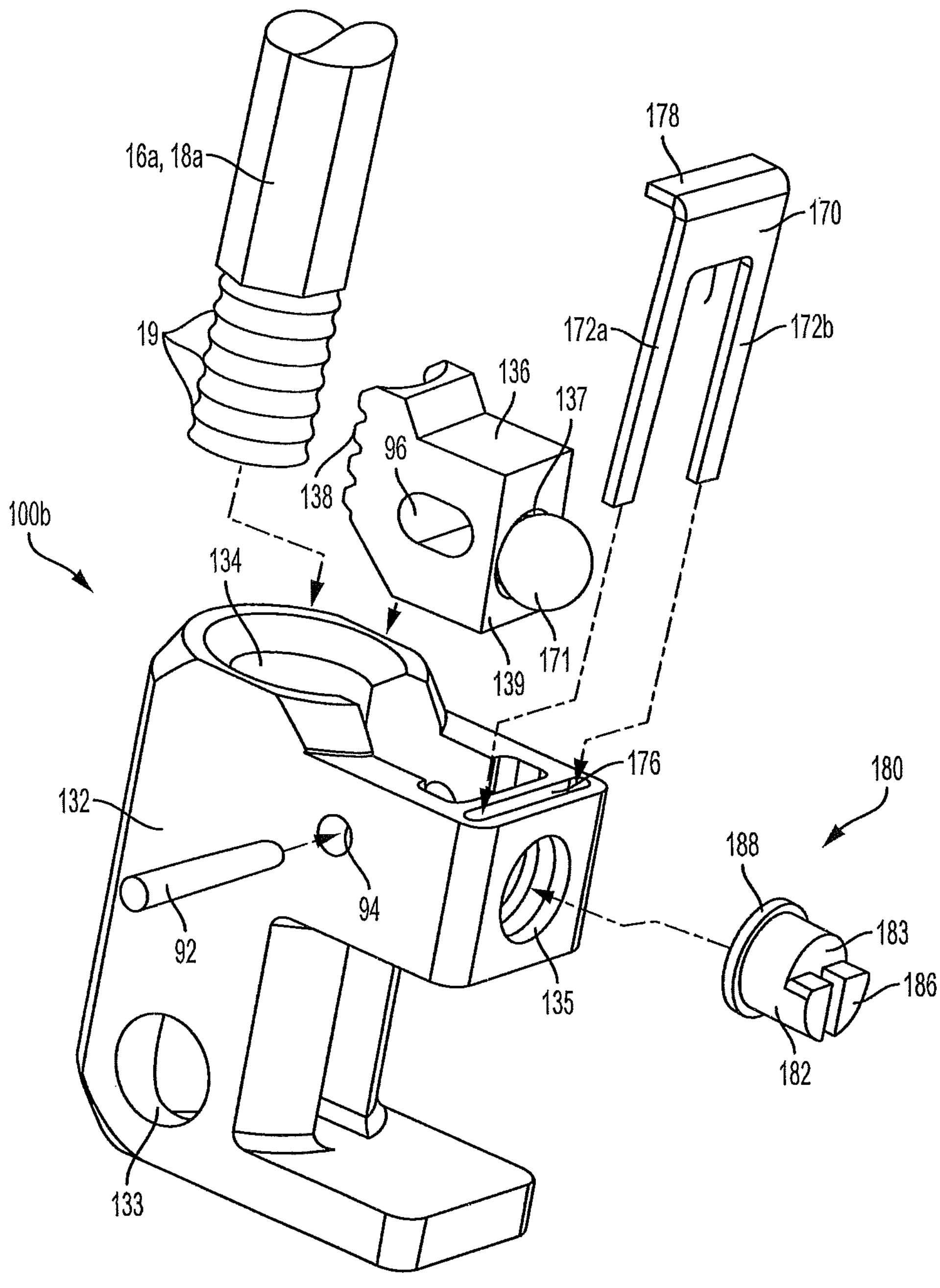
FIG. 32 is a perspective exploded view of the rod carrier retention system embodiment of FIG. 28.
Figure 33:
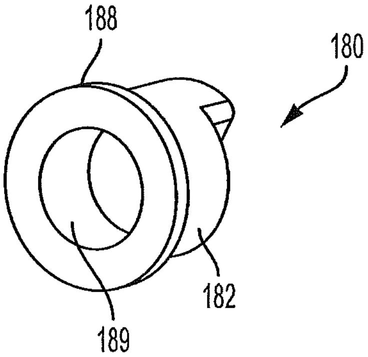
FIG. 33 is a perspective view of the rear portion of the button used in the rod carrier retention system embodiment of FIG. 28.
Figure 34:
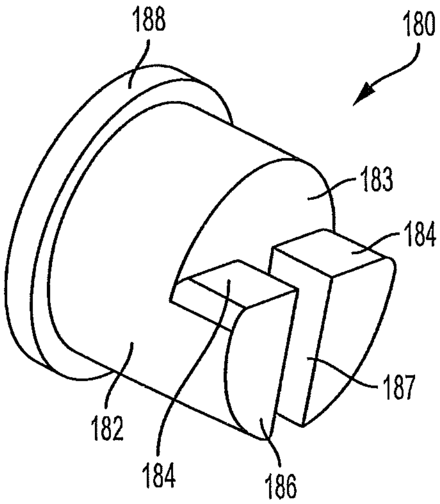
FIG. 34 is a perspective view of the front portion of the button used in the rod carrier retention system embodiment of FIG. 28.

The button 180 is received in a comparably sized opening 135 in the housing oriented in a direction perpendicular to the vertical rod axis. In FIGS. 32-34, the button embodiment 180 depicted has on its head end 186 a screwdriver blade-receiving slot 187 and an unthreaded shank portion 182 extending from the head end. A flange 188 extends outwardly from the shank end of the button, and includes on its end face a depression or recess 189 for receiving flexible member 171. Flexible member 171 is shown as a sphere or ball of rubber or other flexible polymer, but may be of any other configuration. Because flexible member 171 exerts an outward force against button 180 along the button's longitudinal axis, flange 188 is of a diameter larger than carrier opening 135, so that the button is retained in the carrier. As a result, during assembly button 180 is inserted into carrier housing opening 135 from the inside of the housing, so that head end 186 protrudes from the opening. The size of the securing member 136, flexible member 171, and button 180, and the flexibility of flexible member 171, are selected so that securing member 136 may be retracted to permit the rod end **16*a*, 18*a* to be seated in the carrier. Upon moving button 180 inward against flexible member 171, the flexible member compresses and urges the securing member 136 against the rod end 16*a*, 18*a* to retain the rod in the carriers 100*a*', 100*b*'. Carriers 100*a*', 100*b*' may be secured to the operative components at the upper and lower ends of actuator assembly 30' by any suitable means or connection, such as by a pin through opening 133 (FIG. 7, 29-32**).

The button 180 is shown having a planar face 183 normal to its longitudinal axis and a stepped detent or indentation 184 in what would otherwise be the cylindrical shape of the shank at the head end 186. The stepped detent or indentation 184 in this embodiment comprises an outwardly stepped flat surface portion in the periphery of the head end 186, and may be perpendicular to the screwdriver slot and to the button face 183 as shown.

As shown in FIGS. 28-32, gate member 170 is provided as a locking member to bear against the face 183 and flat 184 of the button head. The carrier housing 132 includes openings 176 through which a pair of essentially parallel gate legs **172*a*, 172*b* extend parallel to the vertical rod axis and perpendicularly to the button axis. Gate 170 has a planar body with an edge 174 that extends normal to the vertical rod axis between, and faces downward in the same direction as legs 172*a*, 172*b*. The gate 170 may be made of spring steel or other suitable metal or plastic. Gate 170 is moveable up and down, and has an upper flange 178 that may be engaged by a user's finger or a tool to assist in such movement. When in the up position, where gate edge 174 is out of contact with the button head flat 184 and gate body 170 is out of the path of the button longitudinal movement in opening 135, the user may insert rod end 16*a*, 18*a* into carrier opening 134 and push in the button to urge it against flexible member 171, securing member 136 and the rod end. Once the button is in the final inward position where button face 183 is inward of the plane of gate 170, the button head flat 184 is oriented in a direction normal to the longitudinal axis of the rod, and the gate 170 is then slideable to position the gate edge 174 to contact the button head flat 184. In this position button face 183 is urged outward by flexible member 171 and bears against gate 170 and the gate holds button 180** against outward movement, thereby retaining the rod end in the carrier.

In the method aspect of this embodiment of the present invention, gate 170 is removed from carriers 100*a*', 100*b*' or otherwise moved to an open position wherein the gate is out of the path of longitudinal movement of button 180. After the rod end is placed in carrier opening 134 and the flexible member 171 is positioned between the securing member and the button in the carrier housing, button 180 is then depressed toward securing member 136, so as to urge it against the rod end 16*a*, 18*a*. Button 180 is then moved to its final position in which button face 183 is inward of the plane of gate 170 and button flat 184 is oriented normal to the rod axis and parallel to gate edge 174. Gate 170 is moved to a final closed position wherein the gate 170 is adjacent button face 183, blocking the path of longitudinal movement of the button, and gate edge 174 is in contact with button flat 184. The gate and gate edge in that position apply a force to the button to restrict loosening movement of the button outward, thereby retaining the rod end in the carrier. The position of gate 170 may be confirmed visually from the front of the carrier, thereby verifying that the rod is properly retained in the carrier.

When it is desired to remove the rod from the carrier, button 180 may be rotated by a screwdriver in slot 187 with respect to its longitudinal axis to urge one or the other end of the button head flat 184 against gate edge 174 and move the gate upward and away from the button. Once gate 170 is out of the path of longitudinal movement of button 180, the button moves outward by force of the flexible member and removes pressure and compression of flexible member 171 against securing member 136 to loosen and move it away from the rod end to permit the rod to be removed from the rod carrier.

Securing of the vertical rod in the connector/carrier described herein, including those of FIGS. 16-34, may be made before the mortise lock is inserted into the vertical rod interface cassette 40. The screw- or other driver used may be of sufficient length to extend from the side edge of the door having the mortise pocket and within sleeve 44*c* to the set screw 140, 140' or button 180.

Rod Installation Tool

With the vertical rod and latch assembly typically concealed inside a cavity in the door, installation of the rods is complicated due to the inability of the installer to have a clear line of sight to the opening for connection between the lock interface and the rod. The integrated rod guide installation tool of the present invention remedies this deficiency by simplifying alignment of the rod with the lock interface by providing an alignment guide which is slideably retractable along the rod and remains concealed in the door after final installation.

The integrated rod guide installation tool of the present invention is shown in FIGS. 35-39. It should be understood by those skilled in the art that, as described above, each rod has a first end for attachment to a lock interface and a second end for driving a latch extending through the lower door edge and entering into a corresponding strike or opening typically mounted in the floor, or extending through the upper door edge and entering a corresponding strike or opening in the top of the door frame, respectively.

As shown in FIGS. 35-39, in an embodiment, the tool comprises a sleeve 160 that is slideable along a longitudinal axis over the outer surface of the rod 16 or 18 and is extendable beyond the rod first end 16*a*, 18*a*. Sleeve 160 has a first end 162 configured for mating with a receiver 70 coupled to a lock interface 40 having an opening for receiving the rod first end 16*a* or 18*a*. Rod 16, 18 is moveable within and with respect to sleeve 160 such that upon mating of the sleeve with the receiver 70, the rod may be extended beyond the sleeve first end 162 and into the receiver for attachment thereto.

Figure 35:
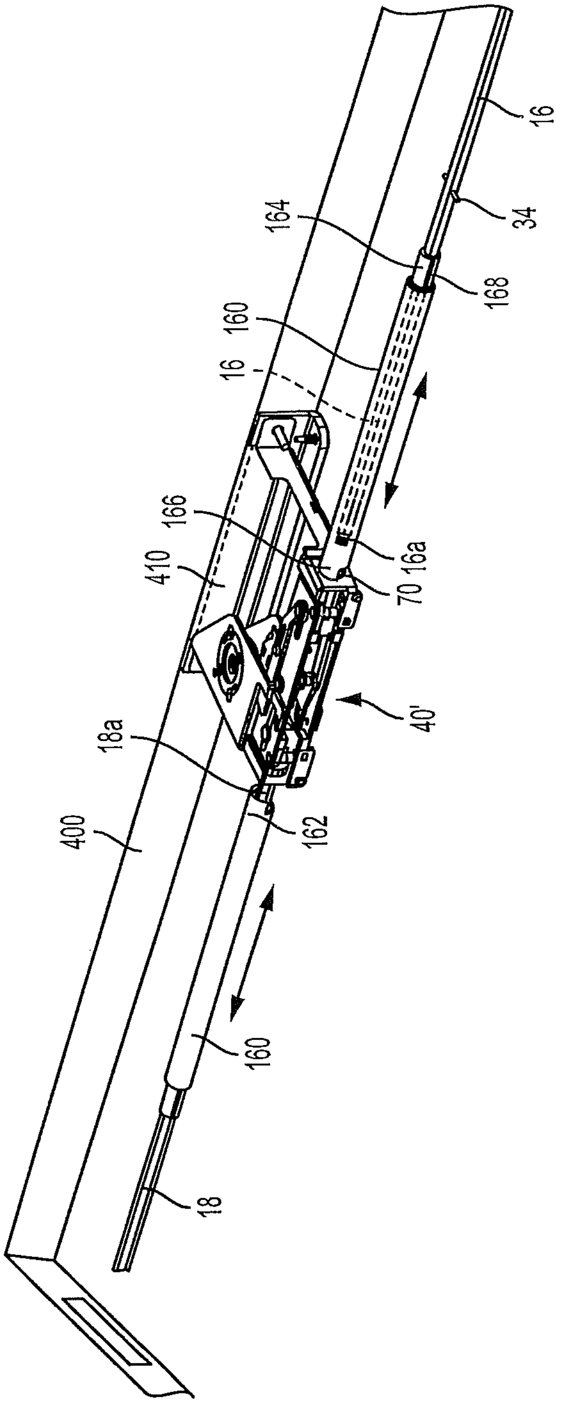
FIG. 35 is a perspective view of a multi-point lock interface in mechanical communication with upper and lower vertical rods affixed with the integrated rod guide installation tool of the present invention, prior to final installation of the rods.
Figure 37:
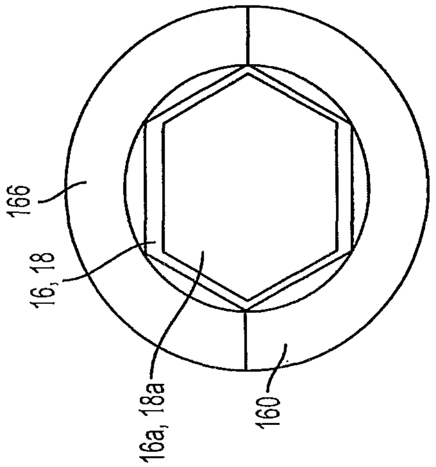
FIG. 37 is a top-down view of the rod guide installation tool and rod end of FIG. 35.
Figure 36:
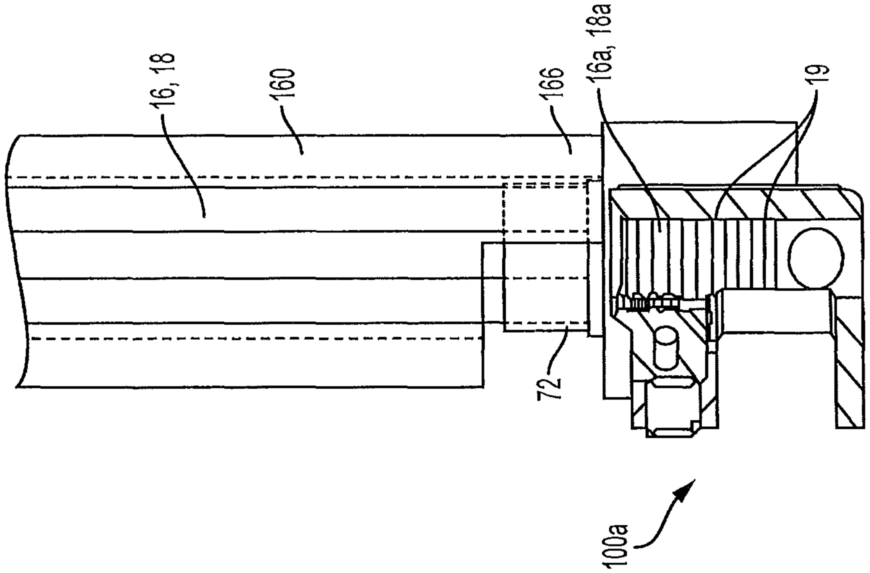
FIG. 36 is a cross sectional view of the rod guide installation tool of the present invention, with the rod end inserted fully into the actuator and secured via the carrier of FIG. 20.
Figure 39:
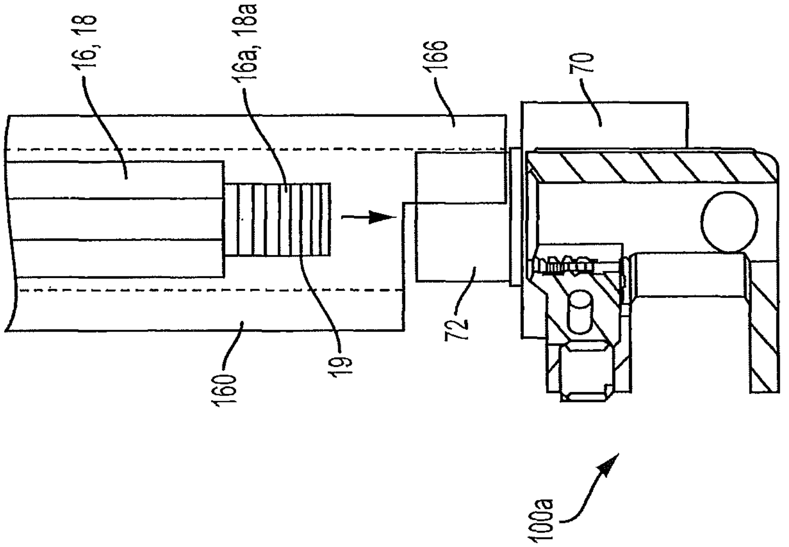
FIG. 39 is a cross sectional view of the rod guide installation tool of the present invention, with the sleeve connected to the receiver and guiding the vertical rod into the carrier found within the actuator.
Figure 38:
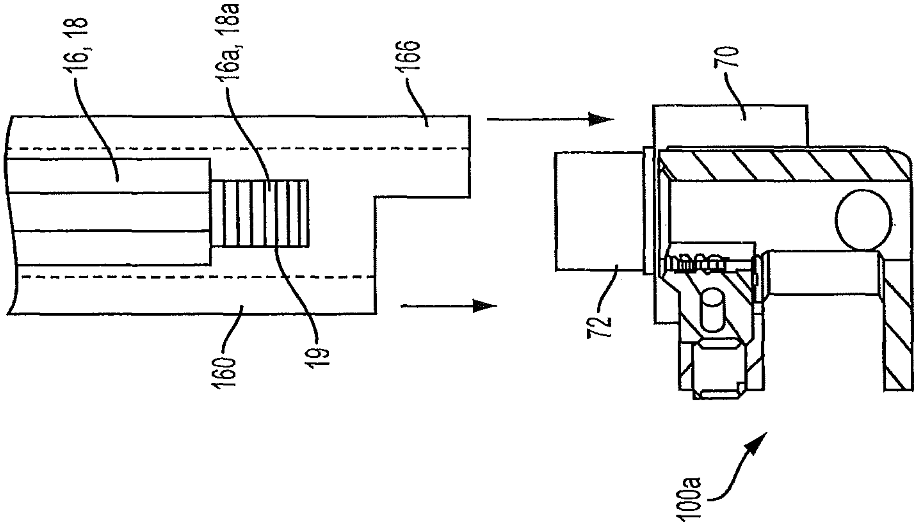
FIG. 38 is a cross sectional view of the rod guide installation tool of the present invention, with the sleeve approaching the receiver for securing the vertical rod.

As shown in FIGS. 15 and 35, lock interface 40 may be constructed as a magazine or cassette that may be inserted into a hollow door 400 (or a solid door with a mortise or opening cut 410 into it) and includes a pair of flat, relatively thin sleeves 44*c*, 44*d* positioned in parallel between the inner surfaces of the door 400 outer panels (not shown). In sleeves 44*c*, 44*d* there are provided relatively thin, disk-like rotatable adapter hubs 46*a*, 46*b* which have central handle shaft openings 22*a*, 22*b*, respectively. The adapter hubs are rotatable with respect to the sleeves 44*c*, 44*d*. The distance between the inner surfaces of the hubs is sufficient to permit the width of a mortise lock 10 to slide therebetween. The interconnect between lock interface 40 and the mortise lock is more particularly described and shown in U.S. Patent App No. 62/381,321 of Sargent Manufacturing Company entitled "Mortise Lock and Vertical Rod Interface Cassette", the entire disclosure of which is incorporated herein by reference.

In an exemplary method of installing a vertical rod using the installation guide of the present invention, as shown in FIGS. 15 and 35-39, sleeve 160 is first extended beyond the first end 16*a* of the rod 16 and mated with the outer surface of the receiver 70, which may be positioned above and/or below, respectively, the body of the lock interface 40 (FIG. 15). Once the sleeve first end 162 is aligned with the receiver, rod 16 is then slid within sleeve 160 in the direction of the receiver 70 beyond the sleeve first end 162, and into receiver 70 for attachment therein (FIG. 35). The rod end may then be attached to actuator 30' by any of the carriers 100, 100' described herein or by other suitable means.

In one or more embodiments, the end 162 of the sleeve has a protrusion 166 extending therefrom which is configured to mate with an outer surface of the receiver. As best shown in the top portion of FIG. 15 and the right side of FIG. 35, protrusion 166 may comprise a semicircular-shaped portion which extends around at least a portion of the outer surface of a circular-shaped receiver 70, which extends from the top of the lock interface body. As also shown in FIGS. 15 and 35-39, a complementary receiver 70*a* extends from the bottom of the lock interface body 42 for receiving a lower vertical rod 18. During installation, the sleeve semicircular protrusion 166 rests against the outer surface of receiver 70, assisting with proper alignment of the rod as it is extended within sleeve 160 beyond the sleeve end 162 and into the receiver opening 70. Sleeve 160 does not interfere with rod attachment in any way, and once the rod has been installed and attached to the lock interface, sleeve 160 is allowed to remain in place, concealed within the door body along with the rod and latch assembly.

As shown in FIG. 35, rod 16 may include a pin or stop 34 which prevents movement of the sleeve 160 away from the lock interface and in the direction of the rod second end (not shown) and associated latch. In at least one embodiment, pin 34 may be received in a slot 168 extending inward from the sleeve second end 164. As further shown in FIG. 35-39, rod 16 or 18 may have a non-circular cross-section and the sleeve 160 may have an inner surface wherein at least a portion of the inner surface comprises a correspondingly shaped cross-section for preventing rotation of the sleeve about the longitudinal axis of the rod. As shown in FIG. 35, rods 16, 18 each have a hexagonal cross-section comprising a plurality of "flats". Sleeve 160 has a correspondingly-shaped hexagonal cross-section for at least a portion of its length, which allows for movement of the sleeve and rod with respect to each other along their respective longitudinal axes (as shown by the arrows), but prevents rotational movement about the longitudinal axis of the rod.

To further assist in alignment of the rod with the lock interface, in one or more embodiments of the present invention, one or both of the sleeve 160 and rod 16, 18 may be comprised of photoluminescent material. In that the rod and latch assembly are concealed within the door body, proper alignment of the rod 16, 18 with the receiver 70, 70*a* is further aided by the photoluminescence afforded by the rod installation guide of the present invention.

Latch Dogging Switch and Indicator

Figure 45:
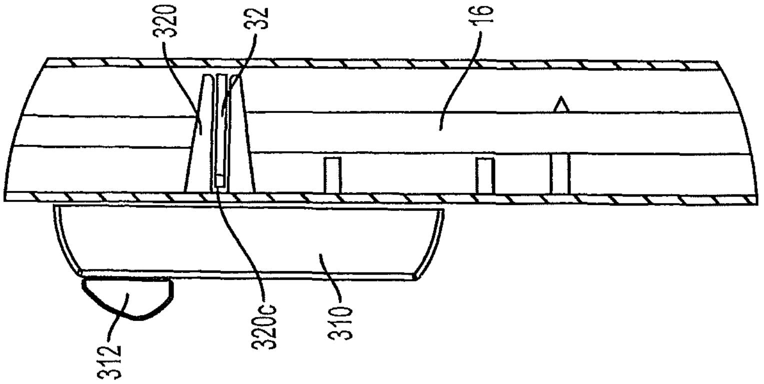
FIG. 45 is a side view of the latch dogging switch installed onto a door surface with the arm fixtures attached to the vertical rod in the door's interior.
Figure 44:
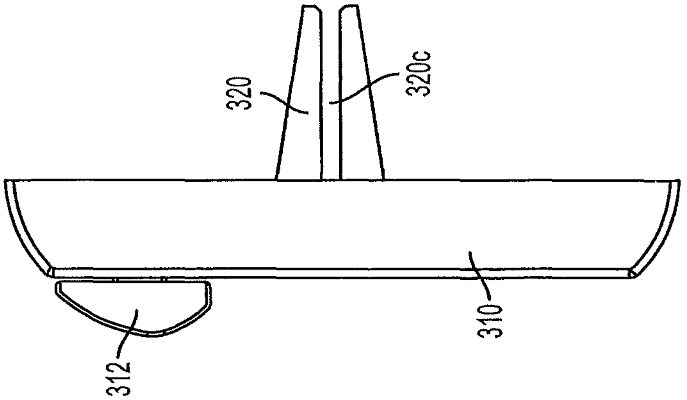
FIG. 44 is a side view of the latch dogging switch.
Figure 46:
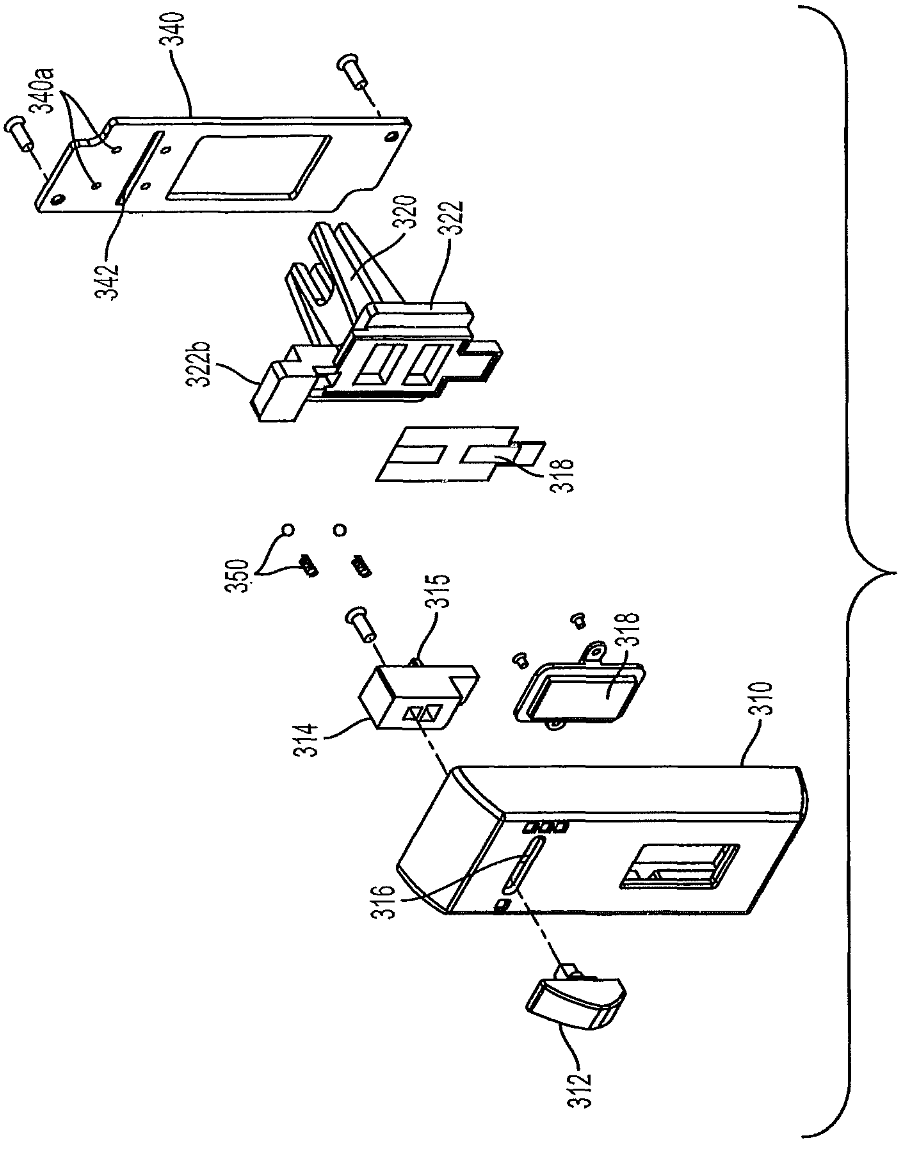
FIG. 46 is an exploded view of the latch dogging switch of FIG. 40.
Figure 48:
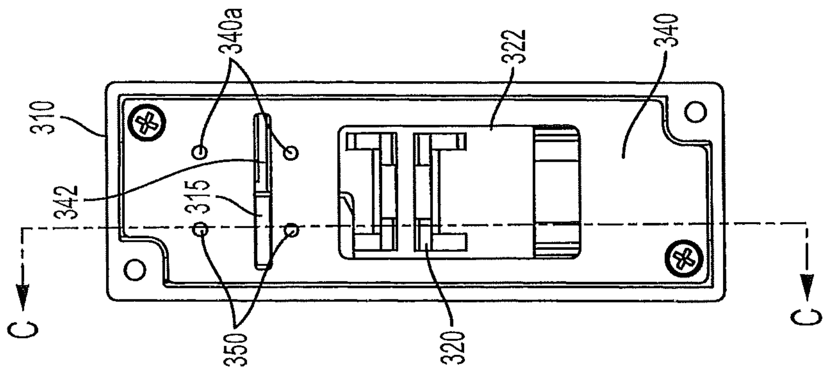
FIG. 48 is a rear view of the latch dogging switch housing showing the switch block in the single-point position, holding the arm fixture in a retracted position.
Figure 47:
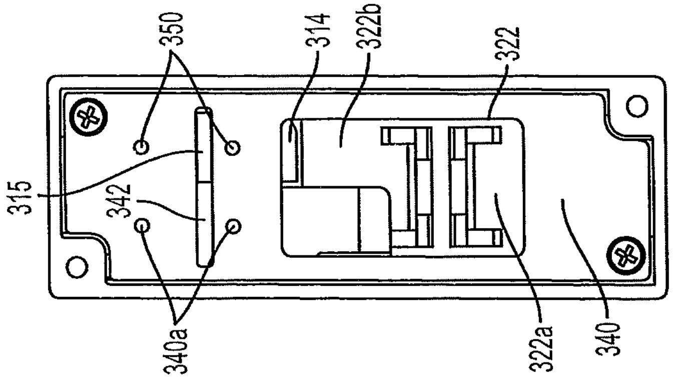
FIG. 47 is a rear view of the latch dogging switch housing showing the switch block in the single-point position, holding the arm fixture in a retracted position.

A latch dogging switch and indicator in accordance with the present invention is shown in FIGS. 40-50. A housing 310 contains an embodiment of the latch dogging switch and indicator of the present invention in the form of a switch 312 that slides laterally in a slot 316. Switch 312 is connected to and moves a switch block 314 (FIGS. 46-48) within the housing 310. Switch 312 can slide between a single-point position 312*a* and a multi-point position 312*b* in a direction perpendicular to the longitudinal axes of the vertical rods. The switch 312 is securely held in positions 312*a* and 312*b* by a spring and ball bearing configuration 350 installed into the switch block 314 within the housing 310 (FIGS. 47-48).

As shown in FIG. 46-48, the switch block 314 has a protruding key or foot 315 which fits into a rear slot 342 located on the rear faceplate 340. Switch block 314 slides laterally through rear slot 342, i.e., normal to the vertical rod axis, cooperatively with the lateral sliding movement of switch 312 through slot 316. When the switch 312 slides into position, it is held in place by the spring and ball bearing configuration 350 acting as a detent. As depicted in FIG. 48, the spring and ball bearing configuration 350 lines up with rear faceplate grooves 340*a* along line C. When the switch 312 is in either the single-point position 312*a* or multi-point position 312*b*, the springs push the ball bearings into the aligned rear faceplate grooves 340*a* cut into the rear faceplate 340 of the housing 310, holding the switch block 314 in place.

Figure 42:
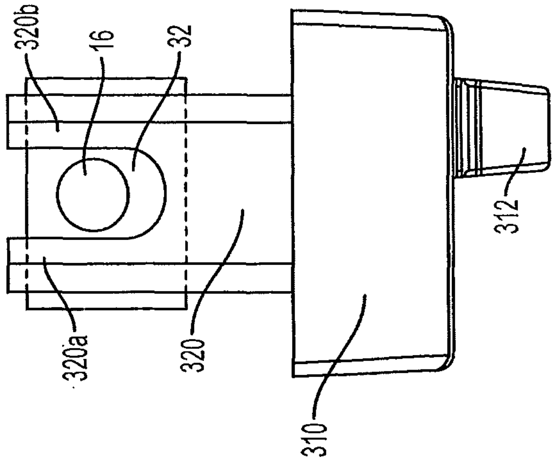
FIG. 42 is a top-down view of the latch dogging switch connected to the rod plate.

Housing 310 also contains the vertical rod engagement structure which includes an arm fixture 320 that protrudes out the rear faceplate 340 of the housing 310. Referring to FIG. 42, the arm fixture 320 has spaced first arm 320*a* and second arm 320*b* which extend parallel to each other from the body of arm fixture 320. The bases of arm fixture first arm 320*a* and arm fixture second arm 320*b* join in the middle of arm fixture body 320 creating a concave shape necessary to properly hold vertical rod 16 between arm fixture first arm 320*a* and arm fixture second arm 320*b*. The arm fixture 320 extends into the interior of the housing 310 forming a perpendicular arm fixture base 322 of the vertical rod engagement structure which is adjacent to the inside surface of housing 310. Arm fixture base 322 comprises a main body 322*a* and an arm fixture base tab 322*b* which is stepped in from the top edge of main body 322*a* and extends out from the planar portion of main body 322*a* (FIG. 46-47).

Figure 50:
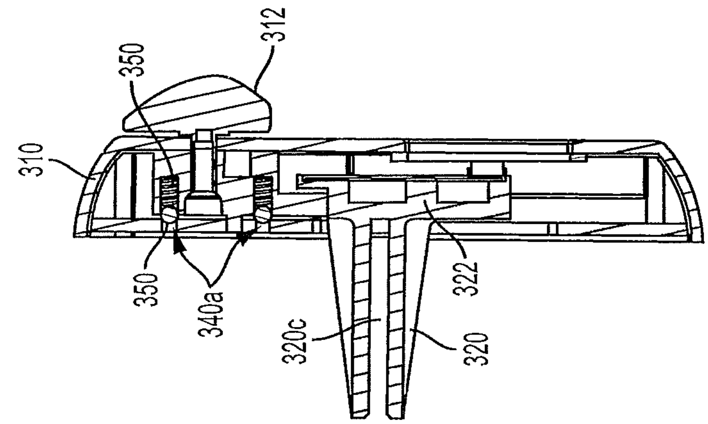
FIG. 50 is a side cross-sectional view of the latch dogging switch of FIG. 40.
Figure 49:
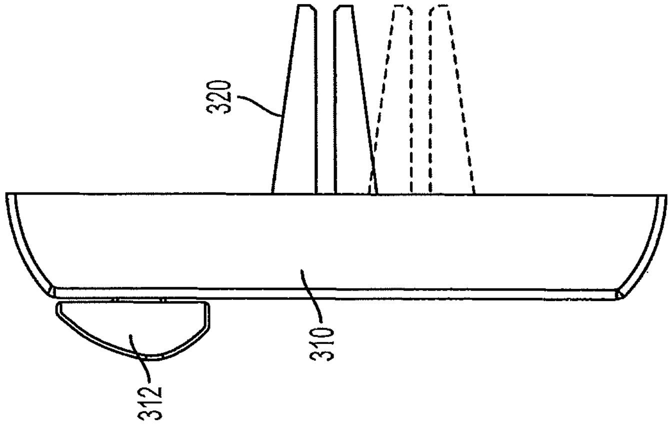
FIG. 49 is a side view of the latch dogging switch in the multi-point position, depicting the arm fixture being vertically slideable within the housing.

Referring to FIGS. 49-50, the arm fixture 320 and base 322 of the vertical rod engagement structure are vertically slideable within housing 310, dependent on which position switch 312 is in. When switch 312 is in the single-point position 312*a*, switch block 314 rests adjacent to and contacting the top edge of arm fixture base tab 322*b*, preventing arm fixture 320 from vertically sliding within housing 310. Vertical rod 16 is prevented from its vertical movement as a result.

When switch 312 is in the multi-point position 312*b*, switch block 314 rests aside and away from arm fixture base tab 322*b* (FIG. 48). This creates a gap or space within housing 310 between the top edge of arm fixture base tab 322*b* and the top interior edge of housing 310. This gap allows arm fixture 320 to slide vertically between the extended, engaged, locked position of the vertical rod 16, and the retracted, disengaged, open position of the vertical rod 16. When arm fixture 320 is in the engaged position, the inward-facing vertical edge of arm fixture base tab 322*b* rests adjacent the opposite inward facing edge of switch block 314 (FIG. 47). The vertical rod 16 is engaged as a result. When arm fixture 320 is in the retracted position, the arm fixture base tab 322*b* rests staggered and separated from switch block 314. The vertical rod 16 is retracted in this position.

Figure 41:
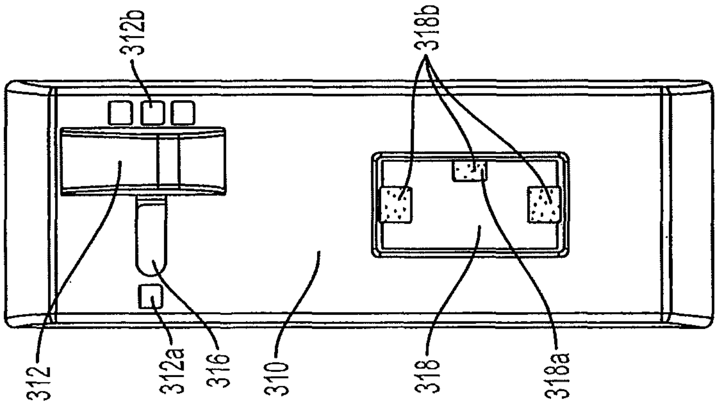
FIG. 41 is a frontal view of the latch dogging switch indicating the multi-point position.
Figure 40:
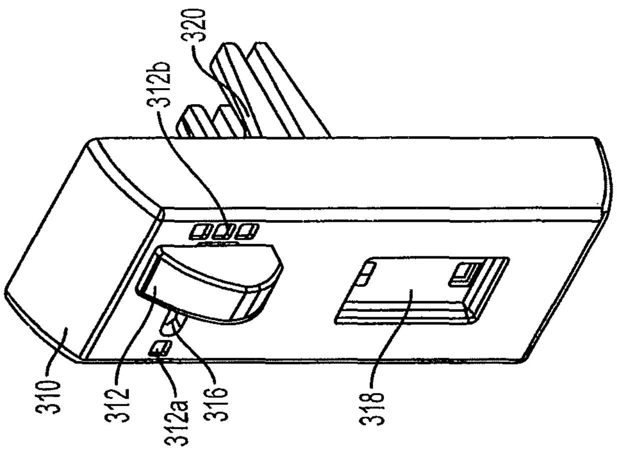
FIG. 40 is a perspective view of the latch dogging switch in the multi-point position.
Figure 43:
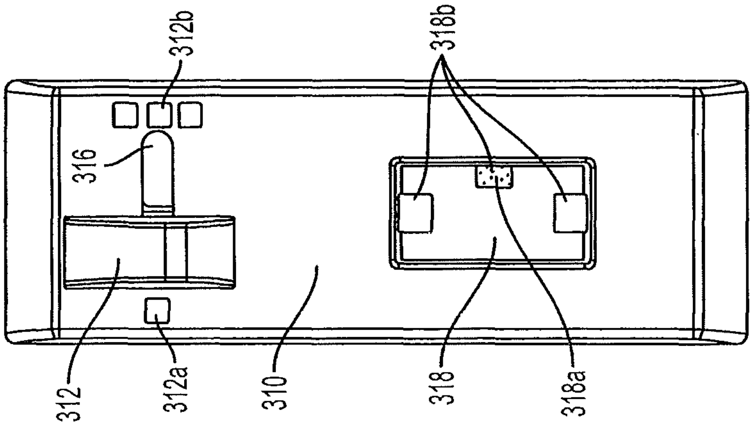
FIG. 43 is a frontal view of the latch dogging switch indicating the single-point position.

Referring to FIGS. 41 and 43, extension (engagement) and retraction (disengagement) of the vertical rod is indicated on the front surface of housing 310 by an indicator panel 318 which has a translucent face with clear portions 318*b*. The front side of base 322 (opposite arms 320*a*, 320*b*) serves as an indicator member with one or more markings that are visible or not visible through the clear portions of the indicator panel. When the vertical rod is retracted in either single-point position 312*a* or multi-point position 312*b*, a single-point indication mark 318*a* on the front side of base 322 is visible in the mid-side clear portion 318*b*, which will show the engagement (or possibility of engagement) of the mid-point latch on indicator 318 (FIG. 43). If the vertical rod is engaged in the multi-point position, an additional pair of multi-point indication marks on the front side of base 322 are visible in the upper and lower clear portions 318*b*, which will show the engagement of the vertical latches on indicator 318 (FIG. 41). The marking pattern for retraction or disengagement of the vertical rod in this embodiment is to show no marks through the indicator panel 318, while the marking pattern for engagement of the vertical rod is to show marks on both the upper and lower portions of the indicator panel. Other marking patterns may be employed. This indicator 318 allows an end user to determine if the vertical rod is engaged or not, thus eliminating a necessity for any extraneous interactions with the multi-point locking configuration.

FIGS. 42 and 45 depicts the latch dogging switch when installed. Housing 310 rests on the face of a door and directly above the door handle or exit device. Arm fixture 320 extends within the interior of the door. Vertical rod 16 rests in the interior of the door between arm fixture first arm 320*a* and arm fixture second arm 320*b*. One embodiment of the vertical rod 16 includes a rod plate 32 which connects perpendicularly to the vertical rod 16. When vertical rod 16 is inserted into the arm fixture 320, the plate 32 fits into a groove 320*c* cut into the middle of arm fixture first arm 320*a*, arm fixture second arm 320*b*, and arm fixture body 320, as shown in FIG. 45. This allows for better contact and vertical movement of the vertical rod 16 in conjunction with arm fixture 320 when switch 312 is in multi-point position 312*b*, and better prevention of rod 16 movement when switch 312 is in single-point position 312*a*.

An exterior lever handle and an interior lever handle 12, 14 are connected together to drive a cam 64 when either handle is turned (FIG. 1). The cam 64 drives both the mid-point or lateral latch 23 and the vertical rod door latch having an upper vertical rod and a lower vertical rod 16, 18. The user may rotate the handles 12, 14 to unlatch the mid-point latch 23 by retracting the mid-point pin from its strike opening while simultaneously the vertical rods 16, 18 are moved to unlatch the upper and lower latches 26, 36 by retracting the upper and lower pins from their respective strike openings. This unlatches the door from the door frame and floor and allows the door to open.

For an end user to engage/disengage the multi-point lock system, while the mid-point 23 and vertical latches 26, 36 are retracted, the user slides the switch 312 found on the face of the housing 310 laterally to either of the multi-point 312*b* or single-point 312*a* position. The multi-point position 312*b* engages all the latches 23, 26, 36 of the multi-point lock system, and the single-point position 312*a* disengages the vertical latches 26, 36 of the multi-point lock system while leaving operable only the mid-point latch 23 as a single-point lock system. The face of the latch dogging switch will display colored indicators 318*a*, 318*b* to convey to the end user whether they are engaging or disengaging the multi-point lock system.

The multi-point position 312*b* allows the vertical bolts 26, 36 which run parallel to the vertical edge of the door 400 or other structure to move freely between the locked and unlocked position. The single-point position 312*a* locks the vertical bolts 26, 36 into place within the door 400 or other structure, preventing them from moving into a locked position when the end user turns the lever handles 12, 14.

While engaging and disengaging the vertical rod 16 as above, the indicator member 318 on the front side of the base attached to the vertical rod 16 displays alternate marking patterns 318*a*, 318*b* visible on the indicator panel on the face of the housing 310. The markings correspond to engagement and disengagement of the vertical rods 16, 18. When the vertical rods 16, 18 are in the retracted position, the indicator panel displays one marking pattern 318*a*, i.e., there are no marks visible at the top and bottom of the indicator panel 318. When the vertical rods are in the engaged position, the indicator panel displays a different marking pattern 318*b*, i.e., marks at both the top and bottom of the panel. The indicator panel further includes a visible marking corresponding to the mid-point latch 23, i.e., a mark visible at the side mid-point of the panel.

Thus, the present invention achieves the objects above. The adapter and interface permit a standard mortise lock to drive top and bottom latch mechanisms of a multi-point lock system. The actuator permits in situ adjustment of the top and bottom vertical latch projections of adjusting these projections while the door is hung in the door frame. The installation tool assists in the installation of the vertical rods in a door. The embodiments of the connector and carrier secure the vertical rods to the actuator and permit verification of retention of the rods in a multi-point latching system. The latch dogging indicator allows for end-user adjustment between a single-point lock and a multi-point lock system when desired.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A retention system for a vertical rod door latch comprising:

a vertical rod door latch having a rod with an end;

a carrier housing for securing the rod end to an actuator to move the vertical rod door latch between engaged and disengaged positions, the carrier housing having an opening for receiving the rod end and a securing member for mechanically engaging the rod end, a securing member slot extending transversely through the securing member;

the carrier housing having a threaded opening for receiving a set screw;

the set screw having threads received in the housing threaded opening, the set screw being rotatable such that upon tightening of the screw, the set screw applies a force to urge the securing member against the rod end to retain the rod in the carrier housing; and a pin anchored within a second opening of the carrier housing and extending through the securing member slot to limit movement of the securing member in a direction normal to a longitudinal axis of the rod.

2. The retention system of claim 1, wherein the securing member further comprises a toothed surface for mechanically engaging a grooved surface of the rod end.

3. The retention system of claim 1 wherein urging of the securing member causes the securing member to move in a direction normal to a longitudinal axis of the rod.

4. The retention system of claim 1 further including a gate member received in a slot of the carrier and slidable therein for engagement with said set screw, said gate member having a flange on an end thereof to limit sliding movement of the gate member within the slot during installation of said set screw.

5. A method of retaining an end of a vertical rod in a vertical rod door latch latching system comprising:

providing a vertical rod door latch having a rod with an end, a carrier housing for securing the rod end to an actuator to move the vertical rod door latch between engaged and disengaged positions, the carrier housing having an opening for receiving the rod end and a second opening having a pin anchored therein, the carrier housing having a threaded opening for receiving a set screw, a securing member for mechanically engaging the rod end and having a securing member slot extending transversely therethrough, the pin extending from the carrier housing second opening through the securing member slot to limit movement of the securing member in a direction normal to a longitudinal axis of the rod, and said set screw having threads received in the housing threaded opening, the screw being rotatable;

rotating the set screw towards the securing member and urging it against the rod end, wherein the set screw applies a force to the securing member; and urging said securing member against the rod end in response to said force such that said rod end retains the rod in the carrier housing.

6. An actuator for moving a vertical rod door latch between locked and open positions and retaining said vertical rod door latch therein, the actuator comprising:

a housing;

a receiver in the housing having an opening adapted to engage an end of a vertical rod;

a carrier for securing an end of the vertical rod within the receiver in the actuator housing, the carrier having an opening for receiving the rod end, a securing member in the carrier for mechanically engaging the rod end, said carrier having a threaded opening for receiving a set screw;

said set screw having threads received in the carrier threaded opening, the set screw being rotatable such that upon tightening of the set screw, the set screw applies a force to urge the securing member against the rod end to retain the rod in the carrier; and a pin anchored within a second opening of the carrier housing and extending through transverse slot of the securing member to limit movement of the securing member in a direction normal to a longitudinal axis of the rod end as the securing member is urged against the rod end.

7. The actuator of claim 6 wherein the securing member further comprises a toothed surface for mechanically engaging a grooved surface of the rod end.

8. A retention system for a vertical rod door latch comprising:

a vertical rod door latch having a rod with an end;

a carrier for securing the rod end to an actuator to move the vertical rod door latch between engaged and disengaged positions, the carrier having an opening for receiving the rod end, a securing member for mechanically engaging the rod end, a pin anchored within a second opening of the carrier and extending through a slot of the securing member to limit movement of the securing member in a direction normal to a longitudinal axis of the rod end as the securing member is urged against the rod end, and a screw for urging the securing member against the rod end to retain the rod in the carrier, the screw having at least one indentation around its periphery, the carrier including a spring having at least one spring surface for bearing against the at least one indentation of the screw, the spring being moveable to permit a user to rotate and tighten the screw to urge the securing member against the rod end, the spring surface applying a force to the at least one indentation to restrict loosening rotation of the screw, thereby retaining the rod end in the carrier.

9. The system of claim 8 wherein the at least one indentation comprises at least one flat surface portion in a shank portion of the screw.

10. The system of claim 8 wherein the screw includes a shank with a plurality of indentations, the indentations comprising a plurality of flat surface detent portions extending around the shank, and the spring includes a pair of parallel legs extending through openings in the carrier, the screw being disposed between the spring legs with surfaces of the spring legs bearing against opposite flat surface portions of the screw shank, the spring legs being moveable outward upon tightening of the screw and bearing against flat surface portions on opposite sides of the screw shank to restrict loosening rotation of the screw when the securing member is in position to retain the rod end in the carrier.

11. The system of claim 8 wherein the screw has a head with a plurality of indentations, the indentations comprising a plurality of flat surface portions extending around the head, and the spring includes a pair of parallel legs on either side of the screw head, the spring in a deformed position permitting rotation of the screw head and tightening of the screw, the spring in an undeformed position having the surfaces of the legs bearing against flat surface portions on opposite sides of the screw head to restrict loosening rotation of the screw when the securing member is in position to retain the rod end in the carrier.

12. The system of claim 8 wherein the vertical rod has a grooved end and the securing member engages grooves on the rod end.

13. A method of retaining an end of a vertical rod in a vertical rod door latch latching system comprising:

providing a carrier for securing the rod end to an actuator to move the vertical rod door latch between engaged and disengaged positions, the carrier having an opening for receiving the rod end, a securing member for mechanically engaging the rod end, and a screw for urging the securing member against the rod end to retain the rod in the carrier, the screw having at least one indentation around an unthread portion of its periphery, the carrier including a spring having at least one spring surface for bearing against the at least one indentation of the screw;

rotating the screw towards the securing member and urging it against the rod end, wherein the spring surface is moved alternately outward and inward between contact with the at least one indentation; and tightening the set screw into a final tightened position of the securing member to retain the rod end in the carrier, wherein the spring moves inward to a detent position where the spring surface bears against the indentation to resist and restrict loosening rotation of the screw.

14. A method of retaining an end of a vertical rod in a vertical rod door latch latching system comprising:

providing a carrier for securing the rod end to an actuator to move the vertical rod door latch between engaged and disengaged positions, the carrier having an opening for receiving the rod end, a securing member for mechanically engaging the rod end, and a screw for urging the securing member against the rod end to retain the rod in the carrier, the screw having at least one indentation around an unthreaded portion of its periphery, the carrier including a spring having at least one spring surface for bearing against the at least one indentation of the screw;

deforming the spring by moving the spring surface out of contact with the at least one indentation of the screw;

rotating the screw into a tightened final position of the securing member to retain the rod end in the carrier; and releasing the spring to an undeformed position wherein the spring surface moves into contact with and bears against the at least one indentation of the screw to resist and restrict loosening rotation of the screw.

15. A set screw retention system comprising:

a housing for securing a member therein, the housing having an opening for receiving the member to be secured and a threaded opening for receiving a set screw to secure the member in the housing;

the set screw having an unthreaded shank portion with a plurality of flat surface detent portions around a periphery of the shank; and a spring having at least one leg bearing against the unthreaded shank portion of the set screw, the spring being moveable to permit a user to rotate and tighten the screw to secure the member in the housing, the spring leg bearing against at least one flat surface detent portion on the shank periphery when the set screw is in a tightened position to apply a force to restrict loosening rotation of the screw, thereby retaining the member in the housing.

16. The system of claim 15 wherein the spring includes a pair of parallel legs extending through openings in the housing, the set screw being disposed between the spring legs with surfaces of the spring legs bearing against opposite flat surface portions of the set screw shank when the set screw is in a tightened position, the spring legs being moveable outward upon tightening of the screw.

* * * * *